United States Patent
Marquette et al.

(10) Patent No.: US 10,405,667 B2
(45) Date of Patent: Sep. 10, 2019

(54) CLIMATE CONTROLLED BEDS AND METHODS OF OPERATING THE SAME

(71) Applicant: Gentherm Incorporated, Northville, MI (US)

(72) Inventors: David Marquette, Farmington Hills, MI (US); Dusko Petrovski, Washington, MI (US); Brian D. Comiskey, Coto de Caza, CA (US)

(73) Assignee: GENTHERM INCORPORATED, Northville, MI (US)

( * ) Notice: Subject to any disclaimer, the term of this patent is extended or adjusted under 35 U.S.C. 154(b) by 0 days.

(21) Appl. No.: 15/880,433

(22) Filed: Jan. 25, 2018

(65) Prior Publication Data

US 2018/0213942 A1 Aug. 2, 2018

Related U.S. Application Data

(63) Continuation of application No. 13/848,620, filed on Mar. 21, 2013, which is a continuation of application
(Continued)

(51) Int. Cl.
*A47C 21/04* (2006.01)
*A47C 7/74* (2006.01)
(Continued)

(52) U.S. Cl.
CPC .............. *A47C 7/74* (2013.01); *A47C 21/044* (2013.01); *B60H 1/00285* (2013.01);
(Continued)

(58) Field of Classification Search
CPC ... A47C 21/048; A47C 21/044; A47C 21/046; A47C 21/04; A47C 21/042
(Continued)

(56) References Cited

U.S. PATENT DOCUMENTS 96,989 A 11/1869 Somes
771,461 A 10/1904 Clifford
(Continued)

FOREIGN PATENT DOCUMENTS

CA 979490 12/1975
CN 2128076 3/1993
(Continued)

OTHER PUBLICATIONS

Feher, Steve, "Stirling Air Conditioned Variable Temperature Seat (SVTS) and Comparison with Thermoelectric Air Conditioned Variable Temperature Seat (VTS)", SAE Technical Paper Series, International Congress and Exposition, No. 980661, Feb. 23-26, 1998, pp. 1-9.
(Continued)

*Primary Examiner* — Fredrick C Conley
(74) *Attorney, Agent, or Firm* — Knobbe, Martens, Olson & Bear, LLP

(57) ABSTRACT

A climate controlled seat, bed or other assembly configured to receive a person includes a blower and two or more thermoelectric devices or other conditioning fluid modules. According to one embodiment of an operational scheme, a control system for the seat or bed is configured to continuously discharge air from the blower through the thermoelectric devices. In one arrangement, the thermoelectric devices are sequenced between an activated and a deactivated position. Consequently, the desired cooling and/or cooling effect can be maintained while reducing energy consumption of the climate control system.

20 Claims, 7 Drawing Sheets

Related U.S. Application Data

No. 13/210,110, filed on Aug. 15, 2011, now Pat. No. 8,402,579, which is a continuation of application No. 13/018,167, filed on Jan. 31, 2011, now Pat. No. 7,996,936, which is a continuation of application No. 12/208,254, filed on Sep. 10, 2008, now Pat. No. 7,877,827.

(60) Provisional application No. 60/971,220, filed on Sep. 10, 2007.

(51) Int. Cl.

| | | |
|---|---|---|
| *B60H 1/00* | (2006.01) | |
| *F24H 3/02* | (2006.01) | |
| *F24H 3/04* | (2006.01) | |
| *F24H 9/20* | (2006.01) | |
| *F25B 21/02* | (2006.01) | |

(52) U.S. Cl.
CPC ......... *B60H 1/00742* (2013.01); *F24H 3/022* (2013.01); *F24H 3/0429* (2013.01); *F24H 9/2071* (2013.01); *F25B 21/02* (2013.01); *B60H 2001/003* (2013.01); *F25B 2321/0211* (2013.01); *F25B 2321/0212* (2013.01)

(58) Field of Classification Search
USPC ................ 5/423, 421, 426, 505.1; 62/3.5
See application file for complete search history.

(56) References Cited

U.S. PATENT DOCUMENTS

| | | |
|---|---|---|
| 1,777,982 A | 6/1929 | Popp |
| 1,839,156 A | 12/1931 | Lumpkin |
| 2,235,620 A | 3/1941 | Nessell |
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,959,017 A | 11/1960 | Gilman et al. |
| 2,976,700 A | 3/1961 | Jackson |
| 2,984,077 A | 5/1961 | Gaskill |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,197,342 A | 7/1965 | Neild |
| 3,209,380 A | 10/1965 | Watsky |
| 3,212,275 A | 10/1965 | Tillman |
| 3,240,628 A | 3/1966 | Sonntag, Jr. |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,392,535 A | 7/1968 | De Castelet |
| 3,486,177 A | 12/1969 | Marshack |
| 3,529,310 A | 9/1970 | Olmo |
| 3,550,523 A | 12/1970 | Segal |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,640,456 A | 2/1972 | Sturgis |
| 3,644,950 A | 2/1972 | Lindsay, Jr. |
| 3,648,469 A | 3/1972 | Chapman |
| 3,653,083 A | 4/1972 | Lapidus |
| 3,703,141 A | 11/1972 | Pernoud |
| 3,767,470 A | 10/1973 | Hines |
| 3,778,851 A | 12/1973 | Howorth |
| 3,786,230 A | 1/1974 | Brandenburg, Jr. |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A | 12/1975 | Bechtel |
| 3,927,299 A | 12/1975 | Sturgis |
| 3,928,876 A | 12/1975 | Starr |
| 4,002,108 A | 1/1977 | Drori |
| 4,044,824 A | 8/1977 | Eskeli |
| 4,124,794 A | 11/1978 | Eder |
| 4,195,687 A | 4/1980 | Taziker |
| 4,223,205 A | 9/1980 | Sturgis |
| 4,224,565 A | 9/1980 | Sosniak et al. |
| 4,281,516 A | 8/1981 | Berthet et al. |
| 4,315,599 A | 2/1982 | Biancardi |
| 4,336,444 A | 6/1982 | Bice et al. |
| 4,338,944 A | 7/1982 | Arkans |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,459,428 A | 7/1984 | Chou |
| 4,491,173 A | 1/1985 | Demand |
| 4,493,939 A | 1/1985 | Blaske et al. |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,549,134 A | 10/1985 | Weiss |
| 4,554,968 A | 11/1985 | Haas |
| 4,563,387 A | 1/1986 | Takagi et al. |
| 4,567,351 A | 1/1986 | Kitagawa et al. |
| 4,572,430 A | 2/1986 | Takagi et al. |
| 4,639,883 A | 1/1987 | Michaelis |
| 4,665,707 A | 5/1987 | Hamilton |
| 4,671,567 A | 6/1987 | Frobose |
| 4,677,416 A | 6/1987 | Nishimoto et al. |
| 4,685,727 A | 8/1987 | Cremer et al. |
| 4,688,390 A | 8/1987 | Sawyer |
| 4,704,320 A | 11/1987 | Mizunoya et al. |
| 4,711,294 A | 12/1987 | Jacobs et al. |
| 4,712,832 A | 12/1987 | Antolini et al. |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,853,992 A | 8/1989 | Yu |
| 4,859,250 A | 8/1989 | Buist |
| 4,905,475 A | 3/1990 | Tuomi |
| 4,923,248 A | 5/1990 | Feher |
| 4,947,648 A | 8/1990 | Harwell et al. |
| 4,969,684 A | 11/1990 | Zarotti |

(56) References Cited

U.S. PATENT DOCUMENTS

| | | |
|---|---|---|
| 4,981,324 A | 1/1991 | Law |
| 4,988,847 A | 1/1991 | Argos et al. |
| 4,997,230 A | 3/1991 | Spitalnick |
| 5,002,336 A | 3/1991 | Feher |
| 5,012,325 A | 4/1991 | Mansuria et al. |
| 5,014,909 A | 5/1991 | Yasuo |
| 5,016,304 A | 5/1991 | Ryhiner |
| 5,022,462 A | 6/1991 | Flint et al. |
| 5,057,490 A | 10/1991 | Skertic |
| 5,070,937 A | 12/1991 | Mougin et al. |
| 5,077,709 A | 12/1991 | Feher |
| 5,088,790 A | 2/1992 | Wainwright et al. |
| 5,097,674 A | 3/1992 | Imaiida et al. |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |
| 5,117,638 A | 6/1992 | Feher |
| 5,119,640 A | 6/1992 | Conrad |
| 5,125,238 A | 6/1992 | Ragan et al. |
| 5,148,977 A | 9/1992 | Hibino et al. |
| 5,166,777 A | 11/1992 | Kataoka |
| 5,187,349 A | 2/1993 | Curhan et al. |
| 5,188,286 A | 2/1993 | Pence, IV |
| 5,255,735 A | 10/1993 | Raghava et al. |
| 5,256,857 A | 10/1993 | Curhan et al. |
| 5,265,599 A | 11/1993 | Stephenson et al. |
| 5,278,936 A | 1/1994 | Shao |
| 5,279,128 A | 1/1994 | Tomatsu et al. |
| 5,335,381 A | 8/1994 | Chang |
| 5,350,417 A | 9/1994 | Augustine et al. |
| 5,367,728 A | 11/1994 | Chang |
| 5,372,402 A | 12/1994 | Kuo |
| 5,375,421 A | 12/1994 | Hsieh |
| 5,382,075 A | 1/1995 | Shih |
| 5,385,382 A | 1/1995 | Single, II et al. |
| 5,409,547 A | 4/1995 | Watanabe et al. |
| 5,413,166 A | 5/1995 | Kerner et al. |
| 5,416,935 A | 5/1995 | Nieh |
| 5,419,489 A | 5/1995 | Burd |
| 5,419,780 A | 5/1995 | Suski |
| 5,430,322 A | 7/1995 | Koyanagi et al. |
| 5,433,741 A | 7/1995 | Truglio |
| 5,448,788 A | 9/1995 | Wu |
| 5,448,891 A | 9/1995 | Nakagiri et al. |
| 5,456,081 A | 10/1995 | Chrysler et al. |
| 5,473,783 A | 12/1995 | Allen |
| 5,493,742 A | 2/1996 | Klearman |
| 5,493,864 A | 2/1996 | Pomerene et al. |
| 5,497,632 A | 3/1996 | Robinson |
| 5,505,520 A | 4/1996 | Frusti et al. |
| 5,515,238 A | 5/1996 | Fritz et al. |
| 5,524,439 A | 6/1996 | Gallup et al. |
| 5,542,503 A | 8/1996 | Dunn et al. |
| 5,544,487 A | 8/1996 | Attey et al. |
| 5,544,488 A | 8/1996 | Reid |
| 5,555,732 A | 9/1996 | Whiticar |
| 5,561,981 A | 10/1996 | Quisenberry et al. |
| 5,576,512 A | 11/1996 | Doke |
| 5,584,084 A | 12/1996 | Klearman et al. |
| 5,584,183 A | 12/1996 | Wright et al. |
| 5,597,200 A | 1/1997 | Gregory et al. |
| 5,601,399 A | 2/1997 | Okpara et al. |
| 5,606,639 A | 2/1997 | Lehoe et al. |
| 5,613,729 A | 3/1997 | Summer, Jr. |
| 5,613,730 A | 3/1997 | Buie et al. |
| 5,623,828 A | 4/1997 | Harrington |
| 5,626,021 A | 5/1997 | Karunasiri et al. |
| 5,626,386 A | 5/1997 | Lush |
| 5,634,342 A | 6/1997 | Peeters et al. |
| 5,637,921 A | 6/1997 | Burward-Hoy |
| 5,640,728 A | 6/1997 | Graebe |
| 5,642,539 A | 7/1997 | Kuo |
| 5,645,314 A | 7/1997 | Liou |
| 5,650,904 A | 7/1997 | Gilley et al. |
| 5,653,741 A | 8/1997 | Grant |
| 5,667,622 A | 9/1997 | Hasegawa et al. |
| 5,675,852 A | 10/1997 | Watkins |
| 5,690,849 A | 11/1997 | DeVilbiss et al. |
| 5,692,952 A | 12/1997 | Chih-Hung |
| 5,704,213 A | 1/1998 | Smith et al. |
| 5,715,695 A | 2/1998 | Lord |
| 5,721,804 A | 2/1998 | Greene, III |
| 5,724,818 A | 3/1998 | Iwata et al. |
| 5,729,981 A | 3/1998 | Markus et al. |
| 5,761,908 A | 6/1998 | Oas et al. |
| 5,761,909 A | 6/1998 | Hughes et al. |
| 5,798,583 A | 8/1998 | Morita |
| 5,800,490 A | 9/1998 | Patz et al. |
| 5,802,855 A | 9/1998 | Yamaguchi et al. |
| 5,802,856 A | 9/1998 | Schaper et al. |
| 5,822,993 A | 10/1998 | Attey |
| 5,827,424 A | 10/1998 | Gillis et al. |
| 5,833,321 A | 11/1998 | Kim et al. |
| 5,850,741 A | 12/1998 | Feher |
| 5,865,031 A | 2/1999 | Itakura |
| 5,871,151 A | 2/1999 | Fiedrich |
| 5,884,485 A | 3/1999 | Yamaguchi et al. |
| 5,884,486 A | 3/1999 | Hughes et al. |
| 5,887,304 A | 3/1999 | Von der Heyde |
| 5,888,261 A | 3/1999 | Fortune |
| 5,895,964 A | 4/1999 | Nakayama |
| 5,902,014 A | 5/1999 | Dinkel et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,289 A | 7/1999 | Bishop, II |
| 5,924,766 A | 7/1999 | Esaki et al. |
| 5,924,767 A | 7/1999 | Pietryga |
| 5,926,884 A | 7/1999 | Biggie et al. |
| 5,927,817 A | 7/1999 | Ekman et al. |
| 5,934,748 A | 8/1999 | Faust et al. |
| 5,936,192 A | 8/1999 | Tauchi |
| 5,937,908 A | 8/1999 | Inoshiri et al. |
| 5,948,303 A | 9/1999 | Larson |
| 5,950,067 A | 9/1999 | Maegawa et al. |
| 5,952,728 A | 9/1999 | Imanishi et al. |
| 5,963,997 A | 10/1999 | Hagopian |
| 5,987,893 A | 11/1999 | Schultz-Harder et al. |
| 5,988,568 A | 11/1999 | Drews |
| 5,992,154 A | 11/1999 | Kawada et al. |
| 5,994,637 A | 11/1999 | Imanushi et al. |
| 5,995,711 A | 11/1999 | Fukuoka et al. |
| 6,000,225 A | 12/1999 | Ghoshal |
| 6,003,950 A | 12/1999 | Larsson |
| 6,006,524 A | 12/1999 | Park |
| 6,019,420 A | 2/2000 | Faust et al. |
| 6,038,865 A | 3/2000 | Watanabe et al. |
| 6,048,024 A | 4/2000 | Wallman |
| 6,049,655 A | 4/2000 | Vazirani |
| 6,052,853 A | 4/2000 | Schmid |
| 6,053,163 A | 4/2000 | Bass |
| 6,059,018 A | 5/2000 | Yoshinori et al. |
| 6,062,641 A | 5/2000 | Suzuki et al. |
| 6,072,924 A | 6/2000 | Sato et al. |
| 6,072,938 A | 6/2000 | Peterson et al. |
| 6,073,998 A | 6/2000 | Siarkowski et al. |
| 6,079,485 A | 6/2000 | Esaki et al. |
| 6,084,172 A | 7/2000 | Kishi et al. |
| 6,085,369 A | 7/2000 | Feher |
| 6,086,831 A | 7/2000 | Harness et al. |
| 6,087,638 A | 7/2000 | Silverbrook |
| 6,094,919 A | 8/2000 | Bhatia |
| 6,097,088 A | 8/2000 | Sakuragi |
| 6,100,463 A | 8/2000 | Ladd et al. |
| 6,101,815 A | 8/2000 | Van Oort et al. |
| 6,105,373 A | 8/2000 | Watanabe et al. |
| 6,109,688 A | 8/2000 | Wurz et al. |
| 6,112,525 A | 9/2000 | Yoshida et al. |
| 6,112,531 A | 9/2000 | Yamaguchi |
| 6,116,029 A | 9/2000 | Krawec |
| 6,119,463 A | 9/2000 | Bell |
| 6,120,370 A | 9/2000 | Asou et al. |
| 6,127,619 A | 10/2000 | Xi et al. |

(56) References Cited

U.S. PATENT DOCUMENTS

| | | |
|---|---|---|
| 6,141,969 A | 11/2000 | Launchbury et al. |
| 6,145,925 A | 11/2000 | Eksin et al. |
| 6,148,457 A | 11/2000 | Sul |
| 6,158,224 A | 12/2000 | Hu et al. |
| 6,161,241 A | 12/2000 | Zysman |
| 6,161,388 A | 12/2000 | Ghoshal |
| 6,164,076 A | 12/2000 | Chu et al. |
| 6,164,719 A | 12/2000 | Rauh |
| 6,171,333 B1 | 1/2001 | Nelson et al. |
| 6,178,292 B1 | 1/2001 | Fukuoka et al. |
| 6,179,706 B1 | 1/2001 | Yoshinori et al. |
| 6,186,592 B1 | 2/2001 | Orizakis et al. |
| 6,189,966 B1 | 2/2001 | Faust et al. |
| 6,189,967 B1 | 2/2001 | Short |
| 6,196,627 B1 | 3/2001 | Faust et al. |
| 6,196,839 B1 | 3/2001 | Ross |
| 6,206,465 B1 | 3/2001 | Faust et al. |
| 6,213,198 B1 | 4/2001 | Shikata et al. |
| 6,222,243 B1 | 4/2001 | Kishi et al. |
| 6,223,539 B1 | 5/2001 | Bell |
| 6,233,768 B1 | 5/2001 | Harding |
| 6,233,959 B1 | 5/2001 | Kang et al. |
| 6,250,083 B1 | 6/2001 | Chou |
| 6,256,996 B1 | 7/2001 | Ghoshal |
| 6,262,357 B1 | 7/2001 | Johnson et al. |
| 6,263,530 B1 | 7/2001 | Feher |
| 6,266,962 B1 | 7/2001 | Ghoshal |
| 6,282,907 B1 | 9/2001 | Ghoshal |
| 6,289,982 B1 | 9/2001 | Naji |
| 6,291,803 B1 | 9/2001 | Fourrey |
| 6,306,673 B1 | 10/2001 | Imanishi et al. |
| 6,326,610 B1 | 12/2001 | Muramatsu et al. |
| 6,336,237 B1 | 1/2002 | Schmid |
| 6,338,251 B1 | 1/2002 | Ghoshal |
| 6,341,395 B1 | 1/2002 | Chao |
| 6,347,521 B1 | 2/2002 | Kadotani et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,402,470 B1 | 6/2002 | Kvasnak et al. |
| 6,410,971 B1 | 6/2002 | Otey |
| 6,425,527 B1 | 7/2002 | Smole |
| 6,427,449 B1 | 8/2002 | Logan et al. |
| 6,434,328 B2 | 8/2002 | Rutherford |
| 6,452,740 B1 | 9/2002 | Ghoshal |
| 6,470,696 B1 | 10/2002 | Palfy et al. |
| 6,474,073 B1 | 11/2002 | Uetsuji et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,497,720 B1 | 12/2002 | Augustine et al. |
| 6,509,704 B1 | 1/2003 | Brown |
| 6,511,125 B1 | 1/2003 | Gendron |
| 6,519,949 B1 | 2/2003 | Wernlund et al. |
| 6,539,725 B2 | 4/2003 | Bell |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| RE38,128 E * | 6/2003 | Gallup ............... A47C 7/74 |
| | | 62/261 |
| 6,571,564 B2 | 6/2003 | Upadhye et al. |
| 6,573,596 B2 | 6/2003 | Saika |
| 6,574,967 B1 | 6/2003 | Park et al. |
| 6,580,025 B2 | 6/2003 | Guy |
| 6,581,224 B2 | 6/2003 | Yoon |
| 6,581,225 B1 | 6/2003 | Imai |
| 6,583,638 B2 | 6/2003 | Costello et al. |
| 6,596,018 B2 | 7/2003 | Endo et al. |
| 6,598,251 B2 | 7/2003 | Habboub et al. |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B1 | 8/2003 | Flick |
| 6,606,866 B2 | 8/2003 | Bell |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,644,735 B2 | 11/2003 | Bargheer et al. |
| 6,672,076 B2 | 1/2004 | Bell |
| 6,676,207 B2 | 1/2004 | Rauh et al. |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,719,039 B2 | 4/2004 | Calaman et al. |
| 6,725,669 B2 | 4/2004 | Melaragni |
| 6,727,422 B2 | 4/2004 | Macris |
| 6,730,115 B1 | 5/2004 | Heaton |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,766 B2 | 7/2004 | Chu et al. |
| 6,772,825 B2 | 8/2004 | Lachenbuch et al. |
| 6,772,829 B2 | 8/2004 | Lebrun |
| 6,774,346 B2 | 8/2004 | Clothier |
| 6,782,574 B2 | 8/2004 | Totton et al. |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 | 9/2004 | Aoki et al. |
| 6,804,966 B1 | 10/2004 | Chu et al. |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,832,732 B2 | 12/2004 | Burkett et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,868,690 B2 | 3/2005 | Faqih |
| 6,871,365 B2 | 3/2005 | Flick et al. |
| 6,886,351 B2 | 5/2005 | Palfy et al. |
| 6,892,807 B2 | 5/2005 | Fristedt et al. |
| 6,893,086 B2 | 5/2005 | Bajic et al. |
| 6,904,629 B2 | 6/2005 | Wu |
| 6,907,633 B2 | 6/2005 | Paolini et al. |
| 6,907,739 B2 | 6/2005 | Bell |
| 6,923,216 B2 | 8/2005 | Extrand et al. |
| 6,935,122 B2 | 8/2005 | Huang |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |

(56) References Cited

U.S. PATENT DOCUMENTS

| | | |
|---|---|---|
| 6,976,734 B2 | 12/2005 | Stoewe |
| 6,977,360 B2 | 12/2005 | Weiss |
| 6,981,380 B2 | 1/2006 | Chrysler et al. |
| 6,990,701 B1 | 1/2006 | Litvak |
| 7,000,490 B1 | 2/2006 | Micheels |
| 7,036,163 B2 | 5/2006 | Schmid |
| 7,036,575 B1 | 5/2006 | Rodney et al. |
| 7,040,710 B2 | 5/2006 | White et al. |
| 7,052,091 B2 | 5/2006 | Bajic et al. |
| 7,063,163 B2 | 6/2006 | Steele et al. |
| 7,066,306 B2 | 6/2006 | Gavin |
| 7,070,231 B1 | 7/2006 | Wong |
| 7,070,232 B2 | 7/2006 | Minegishi et al. |
| 7,075,034 B2 | 7/2006 | Bargheer et al. |
| 7,082,772 B2 | 8/2006 | Welch |
| 7,084,502 B2 | 8/2006 | Bottner et al. |
| 7,100,978 B2 | 9/2006 | Ekern et al. |
| 7,108,319 B2 | 9/2006 | Hartwich et al. |
| 7,111,465 B2 | 9/2006 | Bell |
| 7,114,771 B2 | 10/2006 | Lofy et al. |
| 7,124,593 B2 | 10/2006 | Feher |
| 7,131,689 B2 | 11/2006 | Brennan et al. |
| 7,134,715 B1 | 11/2006 | Fristedt et al. |
| 7,141,763 B2 | 11/2006 | Moroz |
| 7,147,279 B2 | 12/2006 | Bevan et al. |
| 7,165,281 B2 | 1/2007 | Larssson et al. |
| 7,168,758 B2 | 1/2007 | Bevan et al. |
| 7,178,344 B2 | 2/2007 | Bell |
| 7,181,786 B2 | 2/2007 | Schoettle |
| 7,201,441 B2 | 4/2007 | Stoewe et al. |
| 7,213,876 B2 | 5/2007 | Stoewe |
| 7,220,048 B2 | 5/2007 | Kohlgrüber et al. |
| 7,224,059 B2 | 5/2007 | Shimada et al. |
| 7,231,772 B2 | 6/2007 | Bell |
| 7,244,887 B2 | 7/2007 | Miley |
| 7,246,496 B2 | 7/2007 | Goenka et al. |
| 7,272,936 B2 | 9/2007 | Feher |
| 7,273,981 B2 | 9/2007 | Bell |
| 7,296,315 B2 | 11/2007 | Totton et al. |
| 7,299,639 B2 | 11/2007 | Leija et al. |
| 7,337,615 B2 | 3/2008 | Reidy |
| 7,338,117 B2 | 3/2008 | Iqbal et al. |
| 7,340,907 B2 | 3/2008 | Vogh et al. |
| 7,355,146 B2 | 4/2008 | Angelis et al. |
| 7,356,912 B2 | 4/2008 | Iqbal et al. |
| 7,360,365 B2 | 4/2008 | Codecasa et al. |
| 7,360,416 B2 | 4/2008 | Manaka et al. |
| 7,370,479 B2 | 5/2008 | Pfannenberg |
| 7,370,911 B2 | 5/2008 | Bajic et al. |
| 7,380,586 B2 | 6/2008 | Gawthrop |
| 7,425,034 B2 | 9/2008 | Bajic et al. |
| 7,426,835 B2 | 9/2008 | Bell et al. |
| 7,462,028 B2 | 12/2008 | Cherala et al. |
| 7,469,432 B2 | 12/2008 | Chambers |
| 7,475,464 B2 | 1/2009 | Lofy et al. |
| 7,475,938 B2 | 1/2009 | Stoewe et al. |
| 7,478,869 B2 | 1/2009 | Lazanja et al. |
| 7,480,950 B2 | 1/2009 | Feher |
| 7,506,924 B2 | 3/2009 | Bargheer et al. |
| 7,506,938 B2 | 3/2009 | Brennan et al. |
| 7,513,273 B2 | 4/2009 | Bivin |
| 7,555,792 B2 | 7/2009 | Heaton |
| 7,581,785 B2 | 9/2009 | Heckmann et al. |
| 7,587,901 B2 | 9/2009 | Petrovski |
| 7,587,902 B2 | 9/2009 | Bell |
| 7,591,507 B2 | 9/2009 | Giffin et al. |
| 7,608,777 B2 | 10/2009 | Bell et al. |
| 7,621,594 B2 | 11/2009 | Hartmann et al. |
| 7,640,754 B2 | 1/2010 | Wolas |
| 7,665,803 B2 | 2/2010 | Wolas |
| 7,708,338 B2 | 5/2010 | Wolas |
| 7,731,279 B2 | 6/2010 | Asada et al. |
| RE41,765 E | 9/2010 | Gregory et al. |
| 7,827,620 B2 | 11/2010 | Feher |
| 7,827,805 B2 | 11/2010 | Comiskey et al. |
| 7,862,113 B2 | 1/2011 | Knoll |
| 7,866,017 B2 | 1/2011 | Knoll |
| 7,877,827 B2 | 2/2011 | Marquette et al. |
| 7,892,271 B2 | 2/2011 | Schock et al. |
| 7,908,687 B2 | 3/2011 | Ward et al. |
| 7,914,611 B2 | 3/2011 | Vrzalik et al. |
| 7,937,789 B2 | 5/2011 | Feher |
| 7,963,594 B2 | 6/2011 | Wolas |
| 7,966,835 B2 | 6/2011 | Petrovski |
| 7,969,738 B2 | 6/2011 | Koo |
| 7,996,936 B2 | 8/2011 | Marquette et al. |
| 8,062,797 B2 | 11/2011 | Fisher et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,353,069 B1 | 1/2013 | Miller |
| 8,359,871 B2 | 1/2013 | Woods et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,621,687 B2 | 1/2014 | Brykalski et al. |
| 8,732,874 B2 | 5/2014 | Brykalski et al. |
| 8,782,830 B2 | 7/2014 | Brykalski et al. |
| 8,893,329 B2 | 11/2014 | Petrovski et al. |
| 9,105,808 B2 | 8/2015 | Petrovski |
| 9,105,809 B2 | 8/2015 | Lofy |
| 9,121,414 B2 | 9/2015 | Lofy et al. |
| 9,125,497 B2 | 9/2015 | Brykalski et al. |
| 9,186,479 B1 | 11/2015 | Franceschetti et al. |
| 9,310,112 B2 | 4/2016 | Bell et al. |
| 9,326,616 B2 | 5/2016 | De Franks et al. |
| 9,335,073 B2 | 5/2016 | Lofy |
| 9,445,524 B2 | 9/2016 | Lofy et al. |
| 9,451,723 B2 | 9/2016 | Lofy et al. |
| 9,572,433 B2 | 2/2017 | Lachenbruch et al. |
| 9,596,945 B2 | 3/2017 | Ghanei et al. |
| 9,603,459 B2 | 3/2017 | Brykalski et al. |
| 9,622,588 B2 | 4/2017 | Brykalski et al. |
| 9,651,279 B2 | 5/2017 | Lofy |
| 9,662,962 B2 | 5/2017 | Steinman et al. |
| 9,685,599 B2 | 6/2017 | Petrovski et al. |
| 9,756,952 B2 | 9/2017 | Alletto, Jr. et al. |
| 9,814,641 B2 | 11/2017 | Brykalski et al. |
| 9,857,107 B2 | 1/2018 | Inaba et al. |
| 9,974,394 B2 | 5/2018 | Brykalski et al. |
| 9,989,267 B2 | 6/2018 | Brykalski et al. |
| 10,005,337 B2 | 6/2018 | Petrovski |
| 2001/0005990 A1 | 7/2001 | Kim et al. |
| 2001/0014212 A1 | 8/2001 | Rutherford |
| 2001/0028185 A1 | 10/2001 | Stowe et al. |
| 2002/0017102 A1 | 2/2002 | Bell |
| 2002/0026226 A1 | 2/2002 | Ein |
| 2002/0062854 A1 | 5/2002 | Sharp |
| 2002/0083528 A1 | 7/2002 | Fisher et al. |
| 2002/0092308 A1 | 7/2002 | Bell |
| 2002/0100121 A1 | 8/2002 | Kocurek |
| 2002/0108380 A1 | 8/2002 | Nelsen et al. |
| 2002/0121094 A1 | 9/2002 | VanHoudt |
| 2002/0195844 A1 | 12/2002 | Hipwell |
| 2003/0019044 A1 | 1/2003 | Larsson et al. |
| 2003/0039298 A1 | 2/2003 | Eriksson et al. |
| 2003/0041892 A1 | 3/2003 | Fleurial et al. |
| 2003/0070235 A1 | 4/2003 | Suzuki et al. |
| 2003/0084511 A1 | 5/2003 | Salvatini et al. |
| 2003/0110779 A1 | 6/2003 | Otey et al. |
| 2003/0133492 A1 | 7/2003 | Watanabe |
| 2003/0145380 A1 | 8/2003 | Schmid |
| 2003/0150060 A1 | 8/2003 | Huang |

(56) References Cited

U.S. PATENT DOCUMENTS

| | | |
|---|---|---|
| 2003/0160479 A1 | 8/2003 | Minuth et al. |
| 2003/0188382 A1 | 10/2003 | Klamm et al. |
| 2003/0234247 A1 | 12/2003 | Stern |
| 2004/0090093 A1 | 5/2004 | Kamiya et al. |
| 2004/0098991 A1 | 5/2004 | Heyes |
| 2004/0113549 A1 | 6/2004 | Roberts et al. |
| 2004/0139758 A1 | 7/2004 | Kamiya et al. |
| 2004/0164594 A1 | 8/2004 | Stoewe et al. |
| 2004/0177622 A1 | 9/2004 | Harvie |
| 2004/0177876 A1 | 9/2004 | Hightower |
| 2004/0177877 A1 | 9/2004 | Hightower |
| 2004/0195870 A1 | 10/2004 | Bohlender |
| 2004/0238022 A1 | 12/2004 | Hiller et al. |
| 2004/0255364 A1 | 12/2004 | Feher |
| 2005/0011009 A1 | 1/2005 | Wu |
| 2005/0012204 A1 | 1/2005 | Strnad |
| 2005/0056310 A1 | 3/2005 | Shikata et al. |
| 2005/0067862 A1 | 3/2005 | Iqbal et al. |
| 2005/0072165 A1 | 4/2005 | Bell |
| 2005/0076944 A1 | 4/2005 | Kanatzidis et al. |
| 2005/0078451 A1 | 4/2005 | Sauciuc et al. |
| 2005/0086739 A1 | 4/2005 | Wu |
| 2005/0121065 A1 | 6/2005 | Otey |
| 2005/0126184 A1 | 6/2005 | Cauchy |
| 2005/0140180 A1 | 6/2005 | Hesch |
| 2005/0143797 A1 | 6/2005 | Parish et al. |
| 2005/0145285 A1 | 7/2005 | Extrand |
| 2005/0161072 A1 | 7/2005 | Esser et al. |
| 2005/0173950 A1 | 8/2005 | Bajic et al. |
| 2005/0200166 A1 | 9/2005 | Noh |
| 2005/0202774 A1 | 9/2005 | Lipke |
| 2005/0220167 A1 | 10/2005 | Kanai et al. |
| 2005/0251120 A1 | 11/2005 | Anderson et al. |
| 2005/0257532 A1 | 11/2005 | Ikeda et al. |
| 2005/0268956 A1 | 12/2005 | Take |
| 2005/0278863 A1 | 12/2005 | Bahash et al. |
| 2005/0285438 A1 | 12/2005 | Ishima et al. |
| 2005/0288749 A1 | 12/2005 | Lachenbruch |
| 2006/0005548 A1 | 1/2006 | Ruckstuhl |
| 2006/0005944 A1 | 1/2006 | Wang et al. |
| 2006/0053529 A1 | 3/2006 | Feher |
| 2006/0053558 A1 | 3/2006 | Ye |
| 2006/0078319 A1 | 4/2006 | Maran |
| 2006/0080778 A1 | 4/2006 | Chambers |
| 2006/0087160 A1 | 4/2006 | Dong et al. |
| 2006/0102224 A1 | 5/2006 | Chen et al. |
| 2006/0118158 A1 | 6/2006 | Zhang et al. |
| 2006/0123799 A1 | 6/2006 | Tateyama et al. |
| 2006/0137099 A1 | 6/2006 | Feher |
| 2006/0157102 A1 | 7/2006 | Nakajima et al. |
| 2006/0158011 A1 | 7/2006 | Marlovits et al. |
| 2006/0162074 A1 | 7/2006 | Bader |
| 2006/0175877 A1 | 8/2006 | Alionte et al. |
| 2006/0197363 A1 | 9/2006 | Lofy et al. |
| 2006/0200398 A1 | 9/2006 | Botton et al. |
| 2006/0201161 A1 | 9/2006 | Hirai et al. |
| 2006/0201162 A1 | 9/2006 | Hsieh |
| 2006/0214480 A1 | 9/2006 | Terech |
| 2006/0219699 A1 | 10/2006 | Geisel et al. |
| 2006/0225441 A1 | 10/2006 | Goenka et al. |
| 2006/0225773 A1 | 10/2006 | Venkatasubramanian et al. |
| 2006/0237166 A1 | 10/2006 | Otey et al. |
| 2006/0243317 A1 | 11/2006 | Venkatasubramanian |
| 2006/0244289 A1 | 11/2006 | Bedro |
| 2006/0273646 A1 | 12/2006 | Comiskey et al. |
| 2007/0000898 A1 | 1/2007 | Tung et al. |
| 2007/0017666 A1 | 1/2007 | Goenka et al. |
| 2007/0035162 A1 | 2/2007 | Bier et al. |
| 2007/0040421 A1 | 2/2007 | Zuzga et al. |
| 2007/0069554 A1 | 3/2007 | Comiskey et al. |
| 2007/0086757 A1 | 4/2007 | Feher |
| 2007/0095378 A1 | 5/2007 | Ito et al. |
| 2007/0095383 A1 | 5/2007 | Tajima |
| 2007/0101602 A1 | 5/2007 | Bae et al. |
| 2007/0107450 A1 | 5/2007 | Sasao et al. |
| 2007/0138844 A1 | 6/2007 | Kim |
| 2007/0142883 A1 | 6/2007 | Quincy, III |
| 2007/0145808 A1 | 6/2007 | Minuth et al. |
| 2007/0157630 A1 | 7/2007 | Kadle et al. |
| 2007/0158981 A1 | 7/2007 | Almasi et al. |
| 2007/0163269 A1 | 7/2007 | Chung et al. |
| 2007/0190712 A1 | 8/2007 | Lin et al. |
| 2007/0193279 A1 | 8/2007 | Yoneno et al. |
| 2007/0200398 A1 | 8/2007 | Wolas et al. |
| 2007/0214956 A1 | 9/2007 | Carlson et al. |
| 2007/0227158 A1 | 10/2007 | Kuchimachi |
| 2007/0234742 A1 | 10/2007 | Aoki et al. |
| 2007/0241592 A1 | 10/2007 | Giffin et al. |
| 2007/0251016 A1 | 11/2007 | Feher |
| 2007/0256722 A1 | 11/2007 | Kondoh |
| 2007/0261412 A1 | 11/2007 | Heine |
| 2007/0261413 A1 | 11/2007 | Hatamian et al. |
| 2007/0261548 A1 | 11/2007 | Vrzalik et al. |
| 2007/0262621 A1 | 11/2007 | Dong et al. |
| 2007/0296251 A1 | 12/2007 | Krobok et al. |
| 2008/0000025 A1 | 1/2008 | Feher |
| 2008/0022694 A1 | 1/2008 | Anderson et al. |
| 2008/0023056 A1 | 1/2008 | Kambe et al. |
| 2008/0028536 A1 | 2/2008 | Hadden-Cook |
| 2008/0028768 A1 | 2/2008 | Goenka |
| 2008/0028769 A1 | 2/2008 | Goenka |
| 2008/0053108 A1 | 3/2008 | Wen |
| 2008/0053509 A1 | 3/2008 | Flitsch et al. |
| 2008/0077211 A1 | 3/2008 | Levinson et al. |
| 2008/0078186 A1 | 4/2008 | Cao |
| 2008/0084095 A1 | 4/2008 | Wolas |
| 2008/0087316 A1 | 4/2008 | Inaba et al. |
| 2008/0154518 A1 | 6/2008 | Manaka et al. |
| 2008/0155990 A1 | 7/2008 | Gupta et al. |
| 2008/0163916 A1 | 7/2008 | Tsuneoka et al. |
| 2008/0164733 A1 | 7/2008 | Giffin et al. |
| 2008/0166224 A1 | 7/2008 | Giffin et al. |
| 2008/0245092 A1 | 10/2008 | Forsberg et al. |
| 2008/0263776 A1 | 10/2008 | O'Reagan |
| 2008/0289677 A1 | 11/2008 | Bell et al. |
| 2008/0307796 A1 | 12/2008 | Bell et al. |
| 2009/0000031 A1 | 1/2009 | Feher |
| 2009/0015042 A1 | 1/2009 | Bargheer et al. |
| 2009/0026813 A1 | 1/2009 | Lofy |
| 2009/0033130 A1 | 2/2009 | Marquette et al. |
| 2009/0106907 A1 | 4/2009 | Chambers |
| 2009/0108094 A1 | 4/2009 | Ivri |
| 2009/0126109 A1 | 5/2009 | Lee |
| 2009/0126110 A1 | 5/2009 | Feher |
| 2009/0178700 A1 | 7/2009 | Heremans et al. |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0269584 A1 | 10/2009 | Bell et al. |
| 2009/0293488 A1 | 12/2009 | Coughlan, III et al. |
| 2010/0132379 A1 | 6/2010 | Wu |
| 2010/0132380 A1 | 6/2010 | Robinson, II |
| 2010/0133883 A1 | 6/2010 | Walker |
| 2010/0153066 A1 | 6/2010 | Federer et al. |
| 2010/0154437 A1 | 6/2010 | Nepsha |
| 2010/0154911 A1 | 6/2010 | Yoskowitz |
| 2010/0198322 A1 | 8/2010 | Joseph et al. |
| 2010/0235991 A1 | 9/2010 | Ward et al. |
| 2010/0307168 A1 | 12/2010 | Kohl et al. |
| 2010/0325796 A1 | 12/2010 | Lachenbruch et al. |
| 2011/0010850 A1 | 1/2011 | Frias |
| 2011/0041246 A1 | 2/2011 | Li et al. |
| 2011/0066217 A1 | 3/2011 | Diller et al. |
| 2011/0101741 A1 | 5/2011 | Kolich |
| 2011/0247143 A1 | 10/2011 | Richards et al. |
| 2011/0271994 A1 | 11/2011 | Gilley |
| 2011/0289684 A1 | 12/2011 | Parish et al. |
| 2011/0314837 A1 | 12/2011 | Parish et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0235444 A1 | 9/2012 | Dilley et al. |
| 2012/0239123 A1 | 9/2012 | Weber et al. |
| 2012/0261399 A1 | 10/2012 | Lofy |

(56) References Cited

U.S. PATENT DOCUMENTS

| | | |
|---|---|---|
| 2012/0289761 A1 | 11/2012 | Boyden et al. |
| 2013/0097777 A1 | 4/2013 | Marquette et al. |
| 2013/0125563 A1 | 5/2013 | Jun |
| 2013/0145549 A1 | 6/2013 | Piegdon et al. |
| 2013/0206852 A1 | 8/2013 | Brykalski et al. |
| 2013/0232996 A1 | 9/2013 | Goenka et al. |
| 2013/0239592 A1 | 9/2013 | Lofy |
| 2013/0298330 A1 | 11/2013 | Lachenbruch et al. |
| 2014/0026320 A1 | 1/2014 | Marquette et al. |
| 2014/0030082 A1 | 1/2014 | Helmenstein |
| 2014/0033441 A1 | 2/2014 | Morgan et al. |
| 2014/0090513 A1 | 4/2014 | Zhang et al. |
| 2014/0090829 A1 | 4/2014 | Petrovski |
| 2014/0113536 A1 | 4/2014 | Goenka et al. |
| 2014/0131343 A1 | 5/2014 | Walsh |
| 2014/0137569 A1 | 5/2014 | Parish et al. |
| 2014/0159442 A1 | 6/2014 | Helmenstein |
| 2014/0180493 A1 | 6/2014 | Csonti et al. |
| 2014/0182061 A1 | 7/2014 | Zaiss et al. |
| 2014/0187140 A1 | 7/2014 | Lazanja et al. |
| 2014/0194959 A1 | 7/2014 | Fries et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0338366 A1 | 11/2014 | Adldinger et al. |
| 2015/0238020 A1 | 8/2015 | Petrovski et al. |
| 2015/0289667 A1 | 10/2015 | Oakhill et al. |
| 2015/0351556 A1 | 12/2015 | Franceschetti et al. |
| 2015/0351700 A1 | 12/2015 | Franceschetti et al. |
| 2015/0352313 A1 | 12/2015 | Franceschetti et al. |
| 2015/0355605 A1 | 12/2015 | Franceschetti et al. |
| 2015/0355612 A1 | 12/2015 | Franceschetti et al. |
| 2016/0030234 A1 | 2/2016 | Lofy et al. |
| 2016/0053772 A1 | 2/2016 | Lofy et al. |
| 2016/0137110 A1 | 5/2016 | Lofy et al. |
| 2016/0150891 A1 | 6/2016 | Brykalski et al. |
| 2016/0320104 A1 | 11/2016 | Lofy |
| 2017/0071359 A1 | 3/2017 | Petrovski et al. |
| 2017/0273470 A1 | 9/2017 | Brykalski et al. |
| 2017/0284710 A1 | 10/2017 | Petrovski et al. |
| 2017/0290437 A1 | 10/2017 | Brykalski et al. |
| 2017/0291467 A1 | 10/2017 | Steinman et al. |
| 2018/0140489 A1 | 5/2018 | Brykalski et al. |
| 2018/0172325 A1 | 6/2018 | Inaba et al. |
| 2019/0003726 A1 | 1/2019 | Brykalski et al. |

FOREIGN PATENT DOCUMENTS

| | | |
|---|---|---|
| CN | 1299950 | 6/2001 |
| CN | 1320087 | 10/2001 |
| CN | 1929761 | 3/2007 |
| CN | 101 219 025 | 7/2008 |
| DE | 195 03 291 | 8/1996 |
| DE | 199 12 764 | 9/2000 |
| DE | 299 11 519 | 11/2000 |
| DE | 102 38 552 | 8/2001 |
| DE | 101 15 242 | 10/2002 |
| DE | 201 20 516 | 4/2003 |
| DE | 10 2009 036 332 | 2/2011 |
| EP | 0 424 160 | 4/1991 |
| EP | 0 411 375 | 5/1994 |
| EP | 0 617 946 | 10/1994 |
| EP | 0 621 026 | 10/1994 |
| EP | 0 834 421 | 4/1998 |
| EP | 0 862 901 | 9/1998 |
| EP | 0 878 150 | 11/1998 |
| EP | 1 064 905 | 1/2001 |
| EP | 1 598 223 | 11/2005 |
| EP | 1 972 312 | 9/2008 |
| EP | 1 845 914 | 9/2009 |
| EP | 1 804 616 | 2/2012 |
| EP | 2 073 669 | 11/2012 |
| EP | 2 921 083 | 9/2015 |
| FR | 1 327 862 | 5/1963 |
| FR | 2 790 430 | 9/2000 |
| FR | 2 893 826 | 6/2007 |
| GB | 874660 | 8/1961 |
| GB | 978057 | 12/1964 |
| GB | 2 351 352 | 12/2000 |
| JP | 56-097416 | 8/1981 |
| JP | 60-080044 | 5/1985 |
| JP | 60-085297 | 5/1985 |
| JP | 62-193457 | 12/1987 |
| JP | 01-281344 | 11/1989 |
| JP | 04-052470 | 6/1990 |
| JP | 04-108411 | 4/1992 |
| JP | 04-165234 | 6/1992 |
| JP | 05-026762 | 2/1993 |
| JP | 05-277020 | 10/1993 |
| JP | 06-343664 | 12/1994 |
| JP | 07-003403 | 1/1995 |
| JP | 09-140506 | 6/1997 |
| JP | 10-044756 | 2/1998 |
| JP | 10-165259 | 6/1998 |
| JP | 10-227508 | 8/1998 |
| JP | 10-297243 | 11/1998 |
| JP | 10-332883 | 12/1998 |
| JP | 11-266968 | 10/1999 |
| JP | 2000-060681 | 2/2000 |
| JP | 2000-164945 | 6/2000 |
| JP | 2001-174028 | 6/2001 |
| JP | 2001-208405 | 8/2001 |
| JP | 2002-514735 | 5/2002 |
| JP | 2002-227798 | 8/2002 |
| JP | 2003-204087 | 7/2003 |
| JP | 2003-254636 | 9/2003 |
| JP | 2004-055621 | 2/2004 |
| JP | 2004-174138 | 6/2004 |
| JP | 2005-079210 | 2/2005 |
| JP | 2005-333083 | 12/2005 |
| JP | 2006-001392 | 1/2006 |
| JP | 2006-021572 | 1/2006 |
| JP | 2006-076398 | 3/2006 |
| KR | 2001-0060500 | 7/2001 |
| KR | 10-2005-0011494 | 1/2005 |
| LU | 66619 | 2/1973 |
| RU | 2297207 | 4/2007 |
| WO | WO 94/020801 | 9/1994 |
| WO | WO 95/014899 | 6/1995 |
| WO | WO 95/031688 | 11/1995 |
| WO | WO 96/005475 | 2/1996 |
| WO | WO 97/017930 | 5/1997 |
| WO | WO 98/007898 | 2/1998 |
| WO | WO 98/0031311 | 7/1998 |
| WO | WO 99/002074 | 1/1999 |
| WO | WO 99/023980 | 5/1999 |
| WO | WO 99/044552 | 9/1999 |
| WO | WO 99/058907 | 11/1999 |
| WO | WO 01/078643 | 10/2001 |
| WO | WO 01/084982 | 11/2001 |
| WO | WO 02/011968 | 2/2002 |
| WO | WO 02/053400 | 7/2002 |
| WO | WO 02/058165 | 7/2002 |
| WO | WO 03/014634 | 2/2003 |
| WO | WO 03/051666 | 6/2003 |
| WO | WO 03/063257 | 7/2003 |
| WO | WO 2004/011861 | 2/2004 |
| WO | WO 2005/115794 | 12/2005 |
| WO | WO 2005/120295 | 12/2005 |
| WO | WO 2006/078394 | 7/2006 |
| WO | WO 2007/060371 | 5/2007 |
| WO | WO 2007/089789 | 8/2007 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2009/015235 | 1/2009 |
| WO | WO 2009/036077 | 3/2009 |
| WO | WO 2009/097572 | 8/2009 |
| WO | WO 2010/009422 | 1/2010 |
| WO | WO 2010/088405 | 8/2010 |

(56) References Cited

FOREIGN PATENT DOCUMENTS

| WO | WO 2010/129803 | 11/2010 |
|---|---|---|
| WO | WO 2011/026040 | 3/2011 |
| WO | WO 2011/150427 | 12/2011 |
| WO | WO 2011/156643 | 12/2011 |
| WO | WO 2012/061777 | 5/2012 |
| WO | WO 2013/052823 | 4/2013 |
| WO | WO 2014/164887 | 10/2014 |
| WO | WO 2015/188156 | 12/2015 |

OTHER PUBLICATIONS

Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
I-CAR Advantage Online: The Climate Control Seat System, online article dated Aug. 27, 2001 in 2 pages.
Lofy et al., "Thermoelectrics for Environmental Control in Automobiles", Proceeding of Twenty-First International Conference on Thermoelectrics (ICT 2002), 2002, pp. 471-476.
Murph, Darren, "Kuchofuku's Air Conditioned Bed, Clothing Line", as posted Jun. 29, 2007 to http://www.engadget.com/2007/06/29/kuchofukus-air-conditioned-bed-clothing-line/ in 1 page.
Okamoto et al., "The Effects of a Newly Designed Air Mattress upon Sleep and Bed Climate", Applied Human Science, 1997, vol. 16, No. 4, pp. 161-166.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
Product information for a "Thermo-Electric Cooling & Heating Seat Cushion"; retrieved on May 12, 2008 from http://www.coolorheat.com/.
Product information retrieved on Jan. 30, 2007 from http://store.yahoo.co.jp/maruhachi/28tbe20567.html (no English translation available).
Product information for "SleepDeep™," Fact Sheet retrieved on or about Jun. 2008 from http://www.sleepdeep.se.
Winder et al., "Heat-Retaining Mattress for Temperature Control in Surgery", British Medical Journal, Jan. 17, 1970, p. 168.
International Search Report and Written Opinion received in PCT Application No. PCT/US2010/047173, dated Oct. 7, 2010.
U.S. Appl. No. 14/821,514, filed Aug. 7, 2015, Lofy.
U.S. Appl. No. 15/685,912, filed Aug. 24, 2017, Petrovski et al..
U.S. Appl. No. 15/790,729, filed Oct. 23, 2017, Brykalski et al.
U.S. Appl. No. 15/842,535, filed Dec. 14, 2017, Inaba et al.
Luo, Zhaoxia, "A Simple Method to Estimate the Physical Characteristics of a Thermoelectric Cooler from Vendor Datasheets", Electronics Cooling, Aug. 2008, in 17 pages from https://www.electronics-cooling.com/2008/08/a-simple-method-to-estimate-the-physical-characteristics-of-a-thermoelectric-cooler-from-vendor-datasheets/.
International Search Report and Written Opinion received in PCT Application No. PCT/US2008/075875, dated Jan. 6, 2009.
International Preliminary Report on Patentability received in PCT Application No. PCT/US2008/075875, dated Mar. 25, 2010.
U.S. Appl. No. 15/973,279, filed May 7, 2018, Brykalski et al.

\* cited by examiner

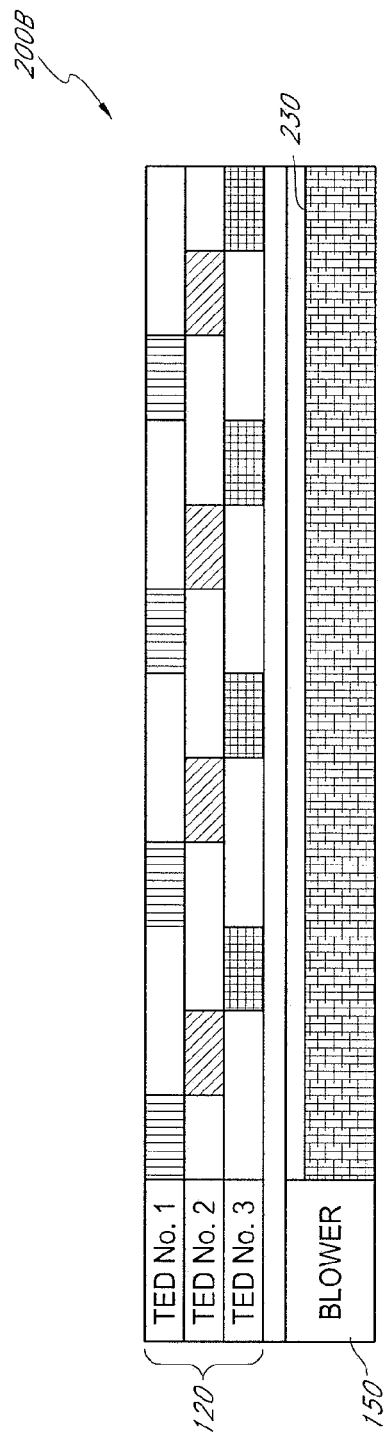
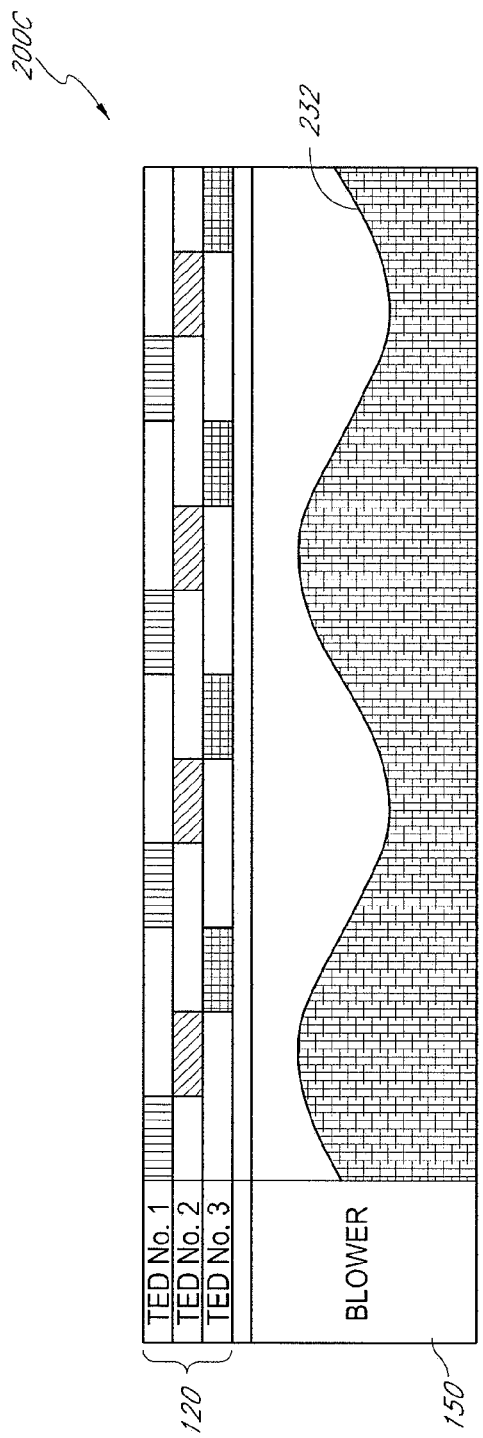
FIG. 2B
FIG. 2C

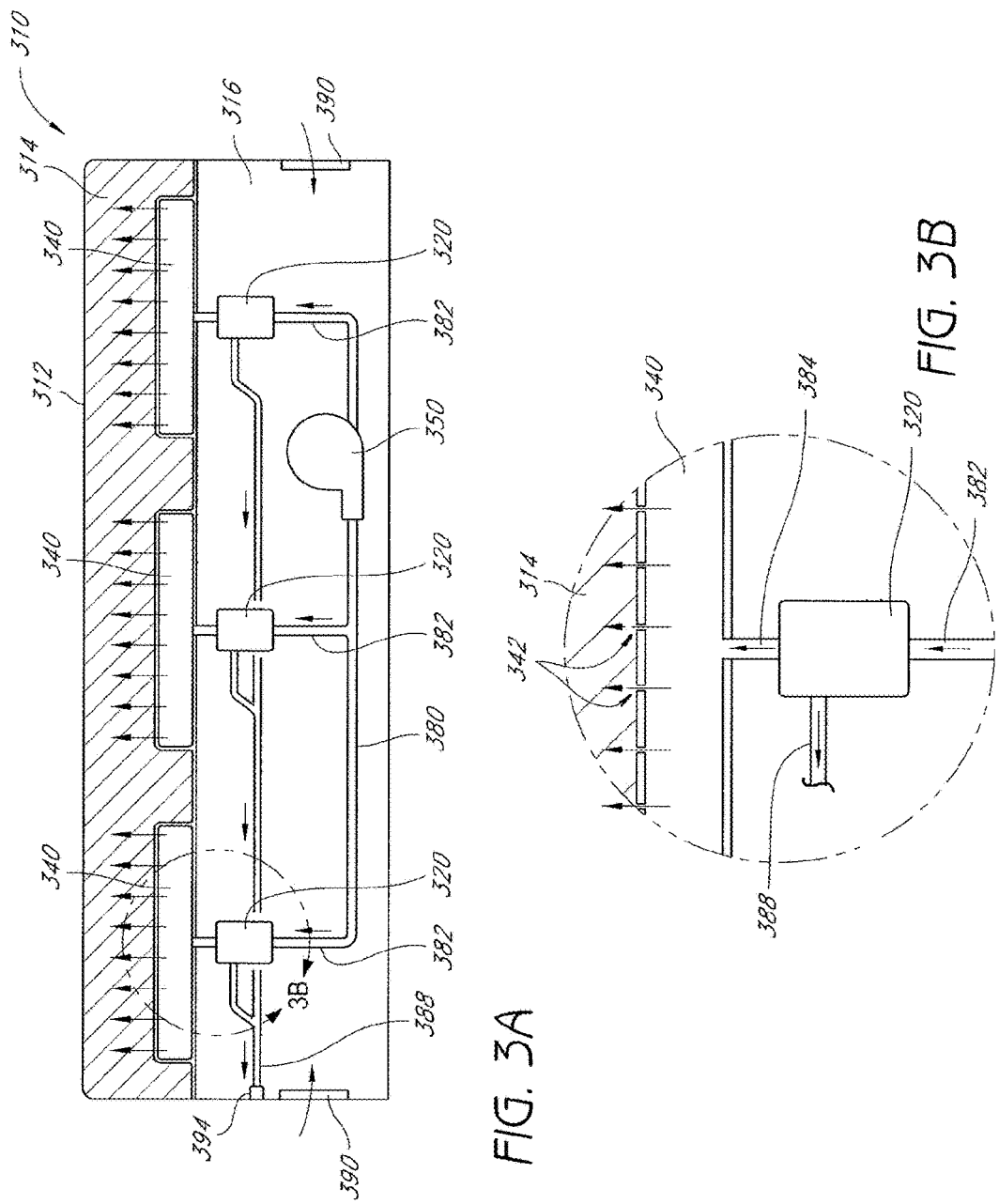

CLIMATE CONTROLLED BEDS AND METHODS OF OPERATING THE SAME

PRIORITY INFORMATION

Any and all applications for which a foreign or domestic priority claim is identified in the Application Data Sheet as filed with the present application are incorporated by reference under 37 CFR 1.57 and made a part of this specification.

BACKGROUND OF THE INVENTION

Field of the Invention

This application relates generally to climate control systems, and more specifically, to operational schemes for climate controlled seats, beds or the like.

Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly.

For such reasons, there exist various types of individualized climate control systems for seats, beds and other similar assemblies. Such climate control systems typically include a blower which distributes ambient air or other fluid past air conditioning devices (e.g., TEDs). The conditioned air can then be delivered to certain desired locations of the seat, bed or other assembly. In order to reduce energy consumption while still maintaining user comfort, it is desirable to operate the climate control system according to one or more control schemes.

SUMMARY OF THE INVENTION

Accordingly, one aspect of the present inventions comprises a climate controlled seat assembly configured to receive a user. The seat assembly includes at least one blower, two or more thermoelectric devices in fluid communication with the blower, an air distribution device downstream of each thermoelectric device and a control system configured to operate the thermoelectric devices according to a desired control scheme. In one embodiment, the control scheme is configured to selectively activate or deactivate the thermoelectric devices while the blower continuously delivers a volume of air to the thermoelectric devices.

According to other embodiments, the seat assembly includes a seating device, a bed or another device configured to receive one or more users. In another embodiment, the control scheme is configured to have only a one thermoelectric device activated at a time. In yet other aspects, the control scheme is configured to have at least two thermoelectric device activated at a time.

In some embodiments, the control system comprises a control module. In other embodiments, the control scheme is based at least in part on a pre-programmed time sequence. In yet other embodiments, the control scheme is based at least in part on a user-selected mode of operation. According to other aspect of the present invention, the user-selected mode of operation includes a plurality of temperature settings. In some embodiments, the user-selected mode of operation comprises a desired temperature value. In still other arrangements, the assembly further comprises a user-interface device, which is configured to allow a user to select a mode of operation. In several embodiments, the user interface device includes a button, a knob, a keypad or the like.

In one embodiment, the control scheme is based at least in part on a reading from at least one sensor. In other embodiments, the sensor comprises a temperature sensor. In some aspects of the present invention, the temperature sensor is configured to detect the temperature of a volume of air downstream of the thermoelectric device. In still other embodiments, the sensor comprises a pressure sensor, which is configured to recognize when a user is positioned on a portion of the seat assembly.

According to other embodiments, a method of delivering conditioned air to a climate controlled item of furniture includes delivering a volume of air into a fluid conduit using a blower, distributing the volume of air to at least two branches and conveying a volume of air directed into each branch through a thermoelectric device. The method further comprises delivering the volume of air from the thermoelectric device to a user situated on the furniture through a fluid distribution device and activating or deactivating the thermoelectric device to regulate the temperature of air entering the fluid distribution device.

In accordance with some embodiments, the item of furniture is a bed, seating device or the like. In other embodiments, the step of delivering a volume of air into a fluid conduit using a blower is substantially continuous. In another embodiment, the method further comprises measuring the temperature of air exiting the thermoelectric device. In still other embodiments, the step of activating or deactivating the thermoelectric device is at least partially regulated by the measured temperature of the air exiting the thermoelectric device.

BRIEF DESCRIPTION OF THE DRAWINGS

These and other features, aspects and advantages of the present inventions are described with reference to drawings of certain preferred embodiments, which are intended to illustrate, but not to limit, the present invention. The drawings include seven (7) figures. It is to be understood that the attached drawings are for the purpose of illustrating concepts of the present inventions and may not be to scale.

FIG. 2B is a schematic illustration of a control scheme for a climate control system according to a second embodiment;

FIG. 2C is a schematic illustration of a control scheme for a climate control system according to a third embodiment;

FIG. 3A is a schematic illustration of a climate control system for a bed which is configured according to one embodiment;

FIG. 3B is detailed view of a portion of the illustrated of FIG. 3A;

DETAILED DESCRIPTION OF THE PREFERRED EMBODIMENTS

Figure 1:
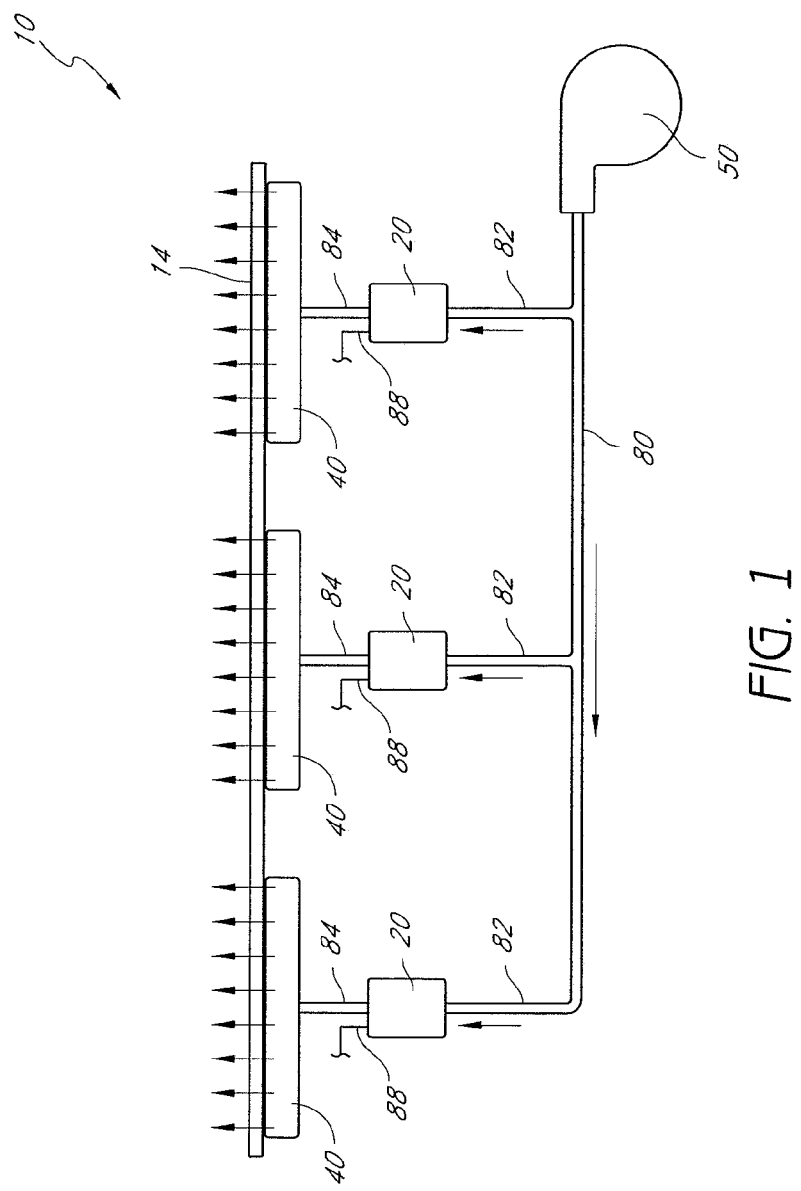
FIG. 1 is a schematic illustration of a climate control system that is configured in accordance with one embodiment.

FIG. 1 schematically illustrates one embodiment of a climate control system 10. The depicted climate control system 10 is particularly well suited to be used in a seat or bed assembly. However, it will be appreciated that the climate control features described herein may be incorporated into other types of assemblies and systems. For example, the control system can be used in office chairs, recliner chairs, sofas, beds, automobile seats, airplane seats, stadium seats, benches and the like.

With continued reference to FIG. 1, the climate control system 10 of the seat assembly comprises a plurality of thermoelectric devices (TEDs) 20 (or other types of fluid modules) and air distribution devices 40. As described herein, one or more blowers 50 or other air transfer devices are configured to deliver air to the air distribution devices 40 via the TEDs 20 or other fluid modules.

In some embodiments, the fluid modules 20 comprise thermoelectric devices (TEDs) that are configured to temperature condition (i.e. to selectively heat or cool) the air or other fluid flowing through them. A preferred thermoelectric device can be a Peltier thermoelectric module. The TED schematically illustrated in FIG. 1 can include a main heat exchanger for transferring or removing thermal energy from the fluid flowing through TED 20 or other type of fluid module and to any downstream distribution systems. Preferably, the TED 20 can also include a secondary heat exchanger that extends from the TED 20 generally opposite the main heat exchanger. In one embodiment, the TED 20 can be configured to cool the main heat exchanger when electrical current is applied to the TED 20 in a first direction. Thus, transferring heat away from the air or other fluid passing in the vicinity of the main heat exchanger. In such an embodiment, the TED 20 is configured to heat the secondary heat exchanger, thereby transferring heat to the air or other fluid passing in the vicinity of the secondary heat exchanger. However, it should be appreciated that if the electrical current is reversed, the main heat exchanger will be heated and the secondary heat exchanger will be cooled. In addition, the extent of heating and/or cooling can be regulated by controlling the amount of electrical current being delivered to each TED 20. Thus, in some embodiments, a fluid module (e.g., TED) can be used to selectively heat and/or cool a volume of air flowing past it. It should also be appreciated in some embodiments described herein the TED can be eliminated or turned off. In such embodiments, a cooling effect ban be provided by blowing ambient air through the distribution system and to the occupant.

As illustrated, a blower 50 is preferably configured to deliver a volume of air through a main header 80. From the main header 80, air can then be distributed to one or more branches 82. In the illustrated embodiment, the air from the main header 80 is divided into three branches 82, each of which delivers a volume of air past a TED 20 or other fluid module. It will be appreciated that a climate control system can have more or fewer branches 82 and/or headers. The blower 50 or other air delivery device can comprise an electrical fan or blower, such as, for example, an axial blower and/or radial fan. In the illustrated embodiment, a single pumping device 50 is used to deliver air to both the main and waste heat exchangers. However, in other embodiments, separate pumping devices can be used to deliver air to the main and waste heat exchangers.

With continued reference to FIG. 1, air flowing past the main heat exchanger portion of each TED 20 is discharged into a main discharge conduit 84. In some embodiments, this conditioned air is then routed to one or more air distribution devices 40 where it is distributed through a plurality of orifices or other openings. Such air distribution devices 40 can be placed immediately adjacent to a chair or bed assembly surface 14 or other user-interface surface. In some embodiments, one or more intermediate layers or devices can be situated between the air distribution device 40 and user-interface surface 14.

In FIG. 1, air flowing through a secondary or waste heat exchanger is routed into separate secondary or waste discharge conduits 88. In some preferred embodiments, the secondary discharge conduits 88 are configured so as to be in hydraulic communication with one another. Therefore, a single collection header (not shown) can be used to collect and remove the secondary or waste air stream to a desired location.

The TEDs 20 illustrated in FIG. 1 are configured to cool (e.g., remove heat) the air flowing past the main heat exchanger and towards the air distribution devices 40. In such embodiments, when the heat exchangers are activated, air flowing past the secondary or waste heat exchangers is warmer than the air entering the TEDs 20. Alternatively, however, one, some or all of the TEDs 20 can be configured to warm air flowing through the main heat exchanger and cool air flowing through the secondary or waste heat exchangers. In other embodiments, a climate control system can be configured so that some TEDs 20 deliver cooler air and some deliver warmer air to air distribution devices 40. Preferably, the climate control system is configured to permit a user to easily modify whether warmer or cooler air is delivered to the air distribution devices 40.

The TEDs 20 described herein represent only one exemplary embodiment of devices that can be used to condition the air or other fluid supplied by a blower 50. Thus, any of a variety of differently configured fluid modules or other devices may be used to condition a volume of fluid. Other examples of fluid modules that may be used are described in U.S. Pat. Nos. 6,223,539, 6,119,463, 5,524,439 or 5,626,021, which are hereby incorporated by reference in their entirety. Another example of such a fluid module is currently sold under the trademark Micro-Thermal Module™ by Amerigon Inc. In another example, the TED 20 or other fluid module can share one or more components (e.g., blowers, pumping devices, TEDs, etc.) with the vehicles general climate control system.

Such climate control systems can be advantageously configured and/or controlled to reduce capital and/or energy costs. As described herein, the climate control system 10 can include fewer blowers 50 or other air transfer devices. Further, in some embodiments, the climate control system can be operated according to one or more control routines which are adapted to reduce energy consumption. In addition, such energy and cost saving measures can be implemented while maintaining or improving the performance of the climate control system 10.

The climate control systems 10, the control routines and their various features described herein can be used in a variety of user-interface apparatuses, such as, for example, beds (e.g., normal spring beds, select comfort beds, hospital beds, reclining beds, etc.), chairs (e.g., office chairs, task chairs, recliners, etc.), other seating assemblies, sofas, airplane seats, train seats or the like.

The energy consumption of the control system can be reduced by advantageously controlling the operation of one or more of the TEDs 20 or other fluid modules 20. For example, the TEDs 20, which are electrically operated, can be turned on or off according to an energy-reducing control scheme. In other embodiments, the electrical current delivered to one or more TEDs 20 is modulated to achieve a desired level of cooling and/or heating for the air passing therethrough.

In some embodiments, the blower 50 or other air transfer device is configured to continuously operate as fluid modules 20 are turned on/off or modulated. Alternatively, however, the blower 50 can be configured to turn on or off during the operation of the climate control system 10. In other embodiments, the amount of air being delivered to the blower 50 can be varied by controlling the speed of the blower, by modulating one or more valves or by some other method.

Figure 2A:
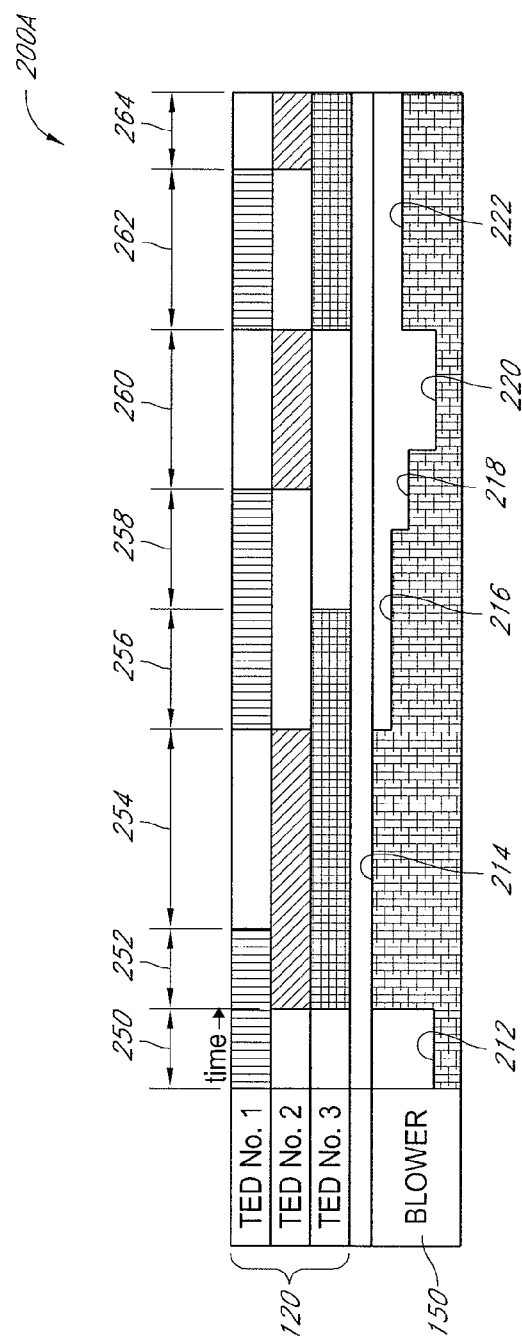
FIG. 2A is a schematic illustration of a control scheme for a climate control system according to a first embodiment.

FIG. 2A schematically illustrates one embodiment of a scheme 200A for controlling the operation of the various components of a climate control system, including TEDs, other fluid modules, blowers and the like over a particular time period. In the depicted embodiment, the control system includes three TEDs 120 and one blower 150. During such an operational scheme 200A, the TEDs 120 can either be turned on or off. Further, the blower 150 can be operated at any one of a plurality of operational levels. Alternatively, the blower can be configured to operate at a constant speed (e.g., on/off operation). In FIG. 2A, the shaded regions indicate that the particular device is operating (or, in the case of a device capable of variable operational levels, the level at which the device is operating) and the white regions indicate that the particular device is not operating.

Thus, during the initial time period 250 in the illustrated embodiment, TED No. 1 is activated and TED Nos. 2 and 3 are deactivated. During that same time period, the blower 150 is delivering air to the climate control system at a relatively low rate (schematically represented by level 212).

With continued reference to FIG. 2A, during the next time interval 252, all three TEDs 120 are activated. In addition, the blower 150 is configured to deliver the maximum volume of air through the control system (schematically represented by operational level 214).

As schematically illustrated, TED Nos. 2 and 3 are configured to remain activated, and TED No. 1 is configured to be deactivated during the subsequent time period 254. Further, under this embodiment, the blower 214 continues to operate at the same level 214 as it did in the previous time interval 252. As shown in FIG. 2A, the operation of the TEDs 120 and the blower 150 can be varied from one time interval to the next. The operational characteristics of the TEDs 120 and/or the blower 150 can be modified (e.g., on/off, speed variation, etc.) in accordance with one or more desired control schemes.

Therefore, if the climate control system is similar to the embodiment illustrated in FIG. 1, the blower can continue to deliver air or other fluid past the TEDs 20 or other fluid modules even when the TEDs 20 are not activated (e.g., not electrically energized). Under such circumstances, fluid distributed through a fluid distribution device 40 may not be temperature conditioned (e.g., cooled or heated) if upstream TEDs 20 are deactivated. In other embodiments, the electrical current supplied to the TEDs 20 can be modulated, either in addition to or in lieu of simple TED activation/deactivation, in order to vary the extent to which air or other fluid is temperature conditioned. Consequently, the flow rate of fluid discharged from a particular fluid distribution device 40 towards a user can remain substantially constant even though the temperature of that fluid varies with time. In other arrangements, both the flow rate and the temperature of a fluid discharged from a fluid distribution device 40 can fluctuate, as TEDs 20 are activated/deactivated and the blower's capacity is modified.

The incorporation of such control schemes in climate control systems can help reduce energy consumption, as some TEDs 20 can be deactivated and/or turned down during certain time periods. In some embodiments, additional energy savings can be realized if the blowers 50 or other fluid delivery devices are configured for adjustable operation. Further, the capital costs and overall complexity of a climate control system can be reduced by utilizing a common header to deliver air or other fluid from a blower 50 to multiple fluid modules 20 (e.g., 20), as illustrated in the embodiment of FIG. 1. As a result, fewer blowers 50, electrical connections and the like may be needed.

FIG. 2B illustrates another embodiment of a scheme 200B for controlling the operation of a climate control system. As shown, the TEDs 120 are configured to turn on or off so that only a single TED 120 is operating at a time. Alternatively, the operational scheme can be configured so that two or more TEDs 120 operate simultaneously. In the illustrated embodiment, the TEDs 120 are configured to be switched on and off in a sequential, orderly pattern. However, the order in which TEDs 120 are activated and deactivated can vary. For example, TEDs 120 can be operated in accordance with a more random pattern.

With continued reference to FIG. 2B, the blower 150 is configured to operate at a constant operating level 230 (e.g., speed, output, etc.). Thus, the amount of air or other fluid being delivered to each TED 120, and consequently to each downstream fluid distribution device, can remain substantially constant. This can help provide a consistent feel and comfort level to users of climate control seating assemblies (e.g., chairs, beds, etc.), as the flow rate of air being discharged from a particular surface or user-interface location does not fluctuate. However, it will be appreciated that as TEDs 120 are activated and deactivated, the temperature of the discharged air or other fluid will vary.

According to certain preferred embodiments, schemes regulating the operation of the TEDs 120 and the blower 40 advantageously maintain a desired cooling or warming effect for the climate controlled seating assembly, while simultaneously reducing unnecessary energy consumption. This can help maintain a generally consistent power consumption rate during the operation of the TEDs 120, the blower 40 and any other components of a temperature conditioning system. Such a consistent power consumption rate can eliminate undesirable and potentially harmful spikes during the delivery of electrical energy. Further, such schemes can help maintain thermal inertia by allowing the temperature conditioning system to more quickly respond to desired temperature variations. In addition, the fairly constant volumetric delivery of conditioned and/or unconditioned air helps provide a more consistent feel to the occupant. Thus, the occupant is less likely to be disturbed or otherwise affected by a modulating flow rate and all the noticeable changes that accompany it (e.g., variations in sounds, feel, etc.).

In FIG. 2C, the control scheme 200C is configured to sequence the TEDs 120 between activated and deactivated positions similarly to the embodiment of FIG. 2B. However, in the illustrated arrangement, the control scheme 200C varies the operation (e.g., speed, flowrate, etc.) of the blower 150. As shown, the operation of the blower 150 follows a substantially sinusoidal pattern over time. Alternatively, the operation of the blower 150 can fluctuate in one or more other manners. For example, the speed and/or output of the blower 150 can follow a linear, non-linear, random, step-like or any other type of pattern. As discussed below, in some embodiments, the blower 150 can be controlled in response to one or more sensor measurements, an input from a user, a preprogrammed schedule, a mode change and/or the like.

Figure 2D:
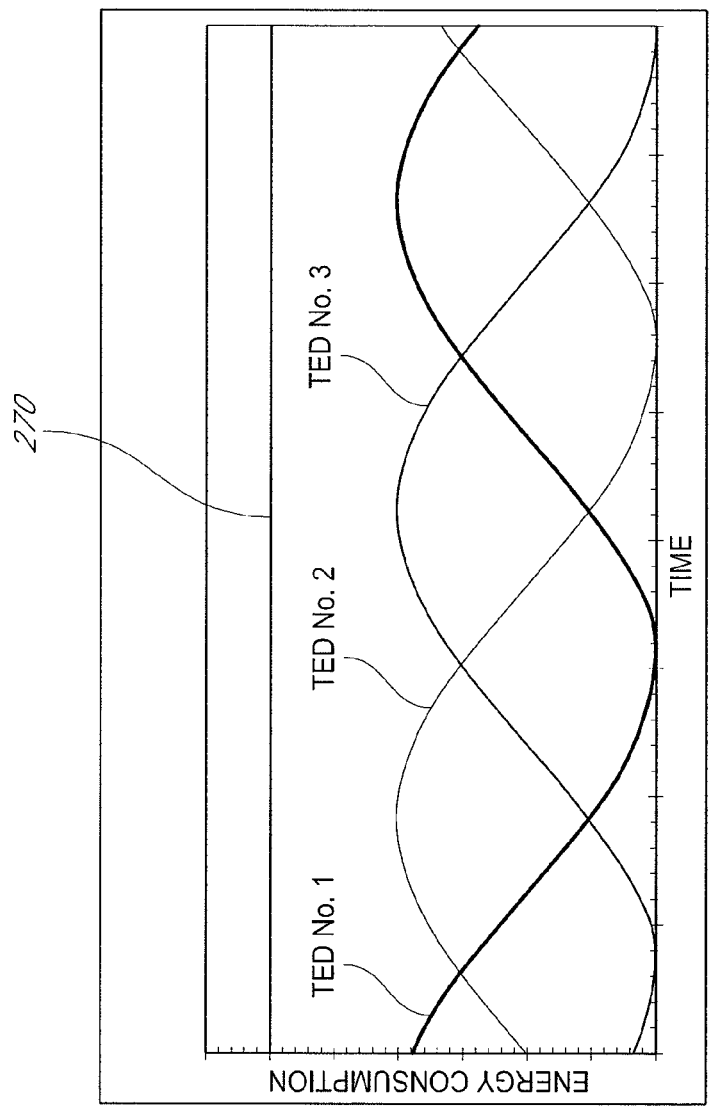
FIG. 2D is a schematic illustration of a control scheme for a climate control system according to a fourth embodiment.

With reference to FIG. 2D, the energy supplied to each TED can be varied according to a sinusoidal or other type of pattern (e.g., linear, non-linear, random, etc.). As shown, if the control scheme is configured to vary the energy (e.g., voltage) supplied to the TEDs according to a particular timing offset, the total amount of energy consumed by the TEDs can remain at a substantially constant level 270 over time. It will be appreciated that in other embodiments the total energy consumption of the TEDs can vary with time. As discussed above, there may be certain advantages associated with having a system that includes generally consistent power consumption and/or fluid flowrate characteristics.

According to certain embodiments, the operational scheme used to control the TEDs, blower and/or other components of a climate control system is based on a preprogrammed sequence. For example, the TEDs and blower can be configured to follow a particular time-based operational schedule, such as in the embodiments illustrated in FIGS. 2A-2D and discussed herein. Therefore, once such a sequence is activated, a climate control system can follow a predetermined pattern in which the operation of the TEDs and/or blowers is modified. In some embodiments, such a time-activated sequence is initiated and/or terminated by the pressing of a button or turning of a knob. However, one or more other methods of initiating such operational sequences can also be used. For example, the sequence can be commenced by manipulating a lever or by entering a command on using a keypad, keyboard, touch screen or other controller.

In other embodiments, an operational sequence is configured to automatically begin and/or end based on the time of day, a timer (e.g., elapsed time from a particular event or occurrence) or the like. In still other configurations, a particular operational scheme can be activated and/or deactivated using feedback received from one or more sensors. For example, a temperature sensor, humidity or dew point sensor, condensation sensor, motion sensor, pressure sensor or the like. For example, a pressure sensor can be used to detect the presence of an individual on or near a climate controlled seat assembly (e.g., chair, bed, etc.). Thus, such seating assemblies can be configured to function in a desired manner when a user triggers a sensor or other activation device. In another embodiment, a humidity sensor can adjust the operating parameters to avoid condensation in the TEDs during humid conditions. In another embodiment, a condensation sensor can be used to adjust the operating parameters if condensation is detected.

Moreover, the climate controlled seating assembly can be configured to function under two or more operational modes. For example, a climate controlled chair or bed can permit a user to select a level of cooling and/or heating (e.g., "Low-Medium-High", "1-2-3-4-5", etc.). Alternatively, seating assemblies can be configured with climate control systems that allow user to enter an actual temperature. In other embodiments, users can select a desired setting, temperature and/or other operational mode using a knob, lever, switch, keypad or the like. In still other arrangements, users are permitted to program an operational scheme for a climate controlled seating assembly that satisfies their unique preferences and/or requirements.

As discussed, control of the TEDs, blower and/or other components of the climate control system can be based, at least partially, on feedback received from one or more sensors. For example, a climate controlled seat, bed or the like can include one or more thermal sensors, optical sensors, motion sensors, audible sensors, pressure sensors and/or the like. In some embodiments, such sensors can be positioned on or near the climate controlled seat assembly to determine whether cooling and/or heating of the assembly is required or desired. For instance, thermal sensors can help determine if the temperature at a surface of the seat assembly is above or below a desired level. Alternatively, one or more thermal sensors can be positioned in or near a TED or fluid conduit to detect the temperature of the discharged fluid. In still other embodiments, temperature sensors can be used to detect the ambient temperature and the control system can be configured to activate the TEDs and/or blowers if the ambient temperature drops or rises below a predetermined temperature and/or a temperature setting determined by the user Likewise, pressure sensors can be configured to detect when a user has been in contact with a surface of a seat, bed or the like for a prolonged time period. Depending on their type, sensors can contact a portion of the seating assembly. In some embodiments, a sensor is located within and/or on the surface of the seating assembly. However, in other arrangements, the sensors are configured so they do not contact the seating assembly.

In some preferred embodiments, a control module is used to control the operation of the TEDs, blowers and/or other system components. Thus, a control module can be configured to execute a desired operational scheme as described herein. The control module can be configured to activate, deactivate and/or modulate the TEDs, blowers and the like. In addition, the control module can include connections to one or more sensors, user-interface devices (e.g., knobs, buttons, or other mode selection devices, keypads, etc.), timers and any other devices that are desirable or necessary for the proper execution of a particular operational scheme. Further, the control module can be adapted to cooperate and communicate with one or more other control systems, such as, for example, an automotive control panel or the like. Thus, a user can select a desired mode of operation directly from a car's dashboard or other instrument panel.

FIGS. 3A and 3B schematically illustrate one embodiment of a climate controlled bed 310 equipped with a control scheme as described herein. As shown, the climate controlled bed 310 comprises a single blower 350 and three TEDs 320. However, in other arrangements, the bed 310 can include more or fewer blowers 350 and TEDs 320, as desired. In some preferred embodiments, the climate controlled bed 310 is configured so that the blower 350, the TEDs 320, conduits 380, 382, 388, the control module (not shown) and any other components of the climate control system are conveniently positioned underneath the mattress, pad or other member on which users can be positioned. For example, such items can be positioned within a box spring or other interior portion of the bed 310 so they are not visible to users. In addition, the bed 310 preferably comprises an power source (e.g., power cord, battery, etc.) from which the various components (e.g., blower 350, TEDs 320, control module, etc.) can be electrically energized.

With continued reference to FIGS. 3A and 3B, the blower 350 can be configured to draw a volume of ambient air or other fluid and discharge it into a main discharge header 380. As illustrated, the bed 310 can include one or more openings 390 to permit fluid to enter the bed interior 316. Once air or other fluid has been delivered into the main discharge header 380, it can be directed to the various distribution branches 382. Although not shown, the main header 380 and/or the distribution branches 382 can include valves and/or other regulation devices to selective control the fluid flowrate and/or pressure to each TED 320 and fluid distribution device 340.

In the illustrated embodiment, air or other fluid diverted into each distribution branch 382 enters a TED 320 or other type of fluid conditioning module. As shown in FIG. 3B, fluid flowing through the TEDs 320 enters either a main discharge conduit 384 or a secondary discharge conduit 388. The TED 320 can be configured to either cool or heat the air entering the main discharge conduit 384. In the event a particular TED 320 is not activated, however, the air exiting into the main discharge conduit 384 will be approximately at the same temperature as the ambient air entering the blower. As discussed, whether a TED is activated or deactivated can depend on the particular operational scheme being used by the climate control system.

With continued reference to FIGS. 3A and 3B, air or other fluid directed into the main discharge conduit 384 can enter into a fluid distribution device 340, regardless of whether or not it was actually conditioned by a TED 320. In some embodiments, the fluid distribution device 340 comprises a plurality of openings 342 through which the air or other fluid exits. As illustrated in FIGS. 3A and 3B, air or other fluid discharged from the air distribution device 340 can contact and diffuse through a mattress 314, pad or other member. Preferably such a mattress 314, pad or other member can be configured to permit fluid discharged from the fluid distribution devices 340 to reach one or more of its exposed surfaces 312.

As illustrated, air or fluid discharged from the TED 320 into the secondary discharge conduit 388 can be collected into a common header and expelled from the bed 310 through one or more outlets 394.

A control scheme as described herein can be advantageously used to manage the operation of the three TEDs 320 and blower 350 depicted in FIGS. 3A and 3B. As discussed, such an operational scheme can be configured to sequence the TEDs 320 between activated and deactivated positions in order to reduce energy consumption. In other embodiments, the operational scheme is capable of modulating the TEDs 320 between minimum and maximum levels. Likewise, under certain arrangements, the control scheme can modulate the flowrate, speed and/or discharge pressure of the blower 350 within a desired range.

Consequently, air or other fluid can flow through the various fluid distribution devices 340 to the exposed surfaces 312 of the mattress 314, regardless of which TEDs 320 were activated or deactivated. Thus, a user can sense a consistent flow of air or other fluid when he or she is situated on the mattress 314. In some embodiments, the climate controlled bed 310 includes a switch, keypad or other user-interface device (not shown) to allow a user to adjust the target temperature, the mode of operation and/or any other setting related to the climate control system. Further, the bed 310 can include one or more sensors that can further enhance the function of the climate control system under certain operational schemes, as described above. For example, as described above, in one embodiment the bed 310 can include a temperature sensor positioned near the TEDs 310, within the distribution devices 340 and/or near the support surface of the mattress 314. A closed loop control routine can be provided for regulating the temperature of the air provided by the TEDs to a predetermined and/or user selected temperature. In another embodiment (or in combination with the previous embodiment), the closed loop control routine can be configured to regulate the temperature of the air provided by the TED in response to measure of the ambient temperature. In another modification, the control system can be configured to deactivate the blower and/or the TEDs after a user selected or predetermined amount of time.

Figure 5:
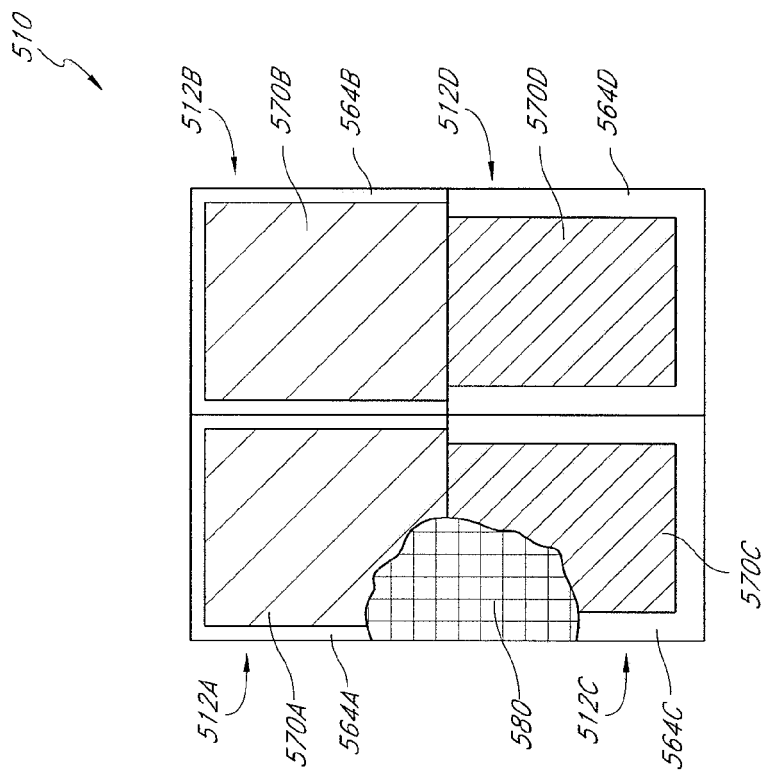
FIG. 5 illustrates a top view of a climate controlled bed with the vast majority of a top member removed in accordance with another embodiment.
Figure 4:
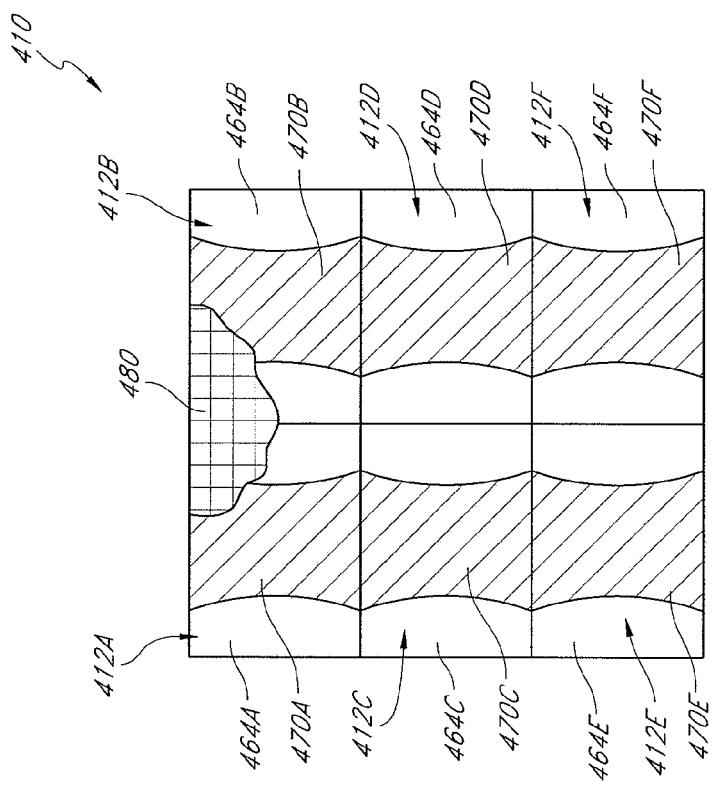
FIG. 4 illustrates a top view of a climate controlled bed with the vast majority of a top member removed in accordance with one embodiment.

FIGS. 4 and 5 illustrate two different embodiments of climate-controlled beds having distinct zones or sections. Such schemes can provide enhanced cooling and/or heating control to certain portions of the bed. Consequently, a user can customize a temperature-conditioning effect to his or her liking. For example, a user can choose to provide more or less cooling or heating to a particular zone or section. Further, such embodiments permit each occupant (e.g., in a dual occupant bed) of a single bed to select a desired level of cooling and/or heating.

In FIG. 4, the illustrated bed 110 includes six different cooling and/or heating zones 412A-F. For clarity, the vast majority of a top member or pad 480 has been removed to reveal the distribution system 470A-F positioned below the pad 480. Each zone 412A-F includes its own flow thermoelectric device (not shown) such that each distribution system can be associated with its own thermoelectric device. In addition, each flow distribution system 470A-F can be configured to receive conditioned (e.g., heated and/or cooled) or unconditioned (e.g., ambient) air or other fluid from one or more fluid transfer devices (not shown). In some embodiments, the air or other fluid delivered by the fluid transfer devices can be routed through, past or in the vicinity of one or more thermoelectric devices to selectively temperature condition the air or other fluid.

With continued reference to FIG. 4, the distribution system 470A-F used in each zone 412A-F is substantially identical in size and shape. However, it will be appreciated that the shape, size, air distribution effect and/or characteristics of the distribution systems 470A-F used within a particular bed 110 can vary, as desired or required by a particular application. In FIG. 5, the flow distribution systems 470A-F are generally positioned where the bed's occupants are most likely to be situated. Thus, depending on the size of the bed, the number of occupants it is intended to hold and/or the like, the number, shape, size, spacing, location and other characteristics of the flow conditioning members 470A-F can vary.

The embodiment of the climate-controlled bed 210 illustrated in FIG. 5 includes only four cooling and/or heating zones 512A-D. As shown, each zone comprises a flow distribution member 570A-D. However, unlike the flow distribution members 470A-F discussed and illustrated with reference to FIG. 4, these flow distribution members 570A-D vary from zone to zone. For example, the flow conditioning members 570A, 570B located in zones 512A, 512B on one end of the bed 510 are larger in surface area than the flow conditioning members 570C, 570D in the other two zones 512C, 512D. As discussed, such a scheme can be used when a higher volume of conditioned fluid is desired in selected zones (e.g., 512A and 512B). Flow distribution members 570A, 570B that require additional volumetric flow and/or better temperature-conditioning abilities can be supplied by additional fluid transfer devices and/or thermoelectric devices.

Additional details and/or embodiments of a climate controlled bed that can be used in combination, sub-combination or as replacement of a certain features are disclosed in U.S. patent application Ser. No. 11/872,657, filed Oct. 15, 2008 and published as No. 2008-0148481 on Jun. 26, 2008, the entire contents of which are hereby incorporated by reference herein.

Figure 6:
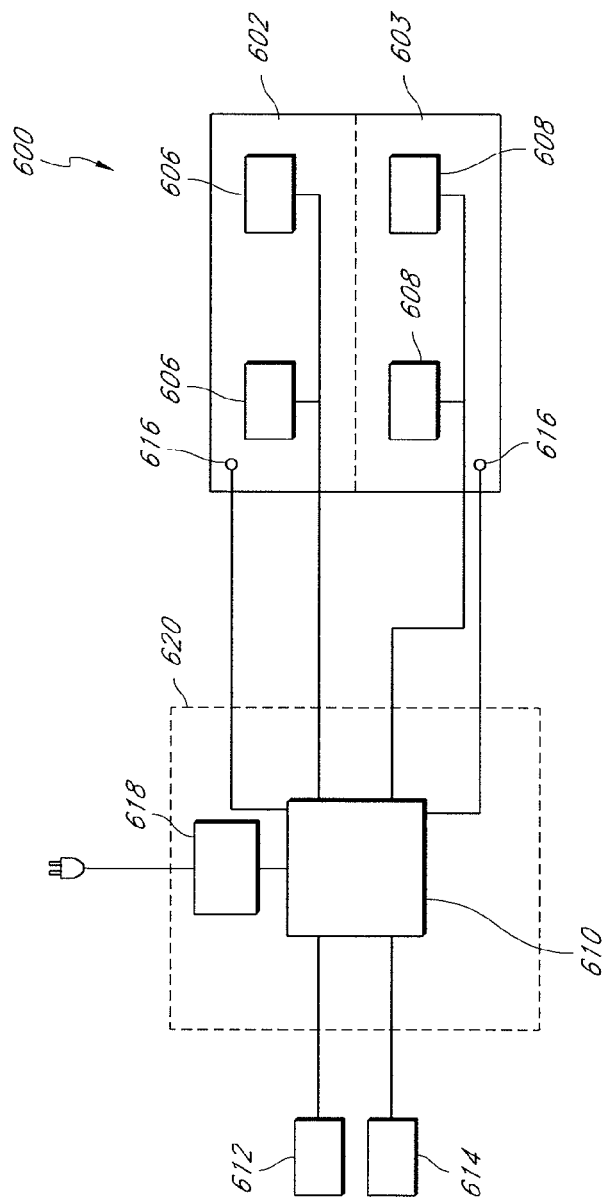
FIG. 6 is a schematic illustration on another embodiment of a climate controlled bed.

FIG. 6 illustrates another embodiment of a climate controlled bed 600. In this embodiment, the bed 600 includes a first side 602 and a second side 604. Each side of the bed can be associated with a set of thermoelectric devices 606, 608. In other embodiment, more or less than two thermoelectric devices can be associated with each zone. Air can be supplied to the thermoelectric devices through a distribution header and then from the thermoelectric devices through a distribution system and air permeable pad as described above. In one embodiment, each side 602, 604 of the bed has a separate distribution system.

The thermoelectric devices 606, 608 can be operatively coupled to a control module 610, which can also be operatively coupled to a blower (not shown) The control module 610 can in turn be operatively coupled to a first and second input device 612, 614. Thus, in one embodiment, a user can input a temperature or conditioning setting for each side of the bed 600 using the input devices 612. In other embodiments, the input devices 612 can be combined into a single device with, for example, different modes.

In one embodiment, the control module 610 is configured for open loop operation which based upon the settings from the input devices the control module 610 operates the TEDs 606, 608 and/or blowers according to a predetermined setting or control routine. In another embodiment, temperature sensors 616 can be provided for detecting the temperature of the air delivered by the TEDs 606, 608 and/or ambient temperature. In such embodiments, the temperature measured by the sensors 616 can be used as a fail safe and/or as part of a closed loop control routine. In one modified arrangement, the control module 610 can be configured to shut off the TEDs and/or blowers after a predetermined amount of time and/or after an amount of time inputted by the user through the input devices 612, 614.

FIG. 6 also illustrates a power supply 618 that can be coupled to the control module. In one embodiment, a single box or housing 620 contains the power supply 618 and the control module 610.

To assist in the description of the disclosed embodiments, words such as upward, upper, downward, lower, vertical, horizontal, upstream, and downstream have and used above to describe the accompanying figures. It will be appreciated, however, that the illustrated embodiments can be located and oriented in a variety of desired positions.

In addition, in the description above, various components are described as being "coupled" together or "operatively coupled" together. It is to be understand that these are intended to be broad terms that includes components that are directly or indirectly connected to each other and/or connected to each other through one or more intermediate members. In addition, with respect to electrical components, the components can be electrically connected directly or indirectly through intermediate components and/or wirelessly (e.g., through IR or other wireless transmission devices.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of these inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

What is claimed is:

1. A climate controlled seat assembly configured to receive an occupant, the climate controlled seat assembly comprising:
   one or more support members configured to receive an occupant;
   one or more air transfer devices configured to deliver air;
   a first thermoelectric device configured to heat or cool air delivered by the one or more air transfer devices;
   a second thermoelectric device configured to heat or cool air delivered by the one or more air transfer devices;
   a first air distribution device downstream of and in fluid communication with the first thermoelectric device, the first air distribution device configured to distribute air from the one or more air transfer devices toward the occupant on the one or more support members along a first area of the one or more support members;
   a second air distribution device downstream of and in fluid communication with the second thermoelectric device, the second air distribution device configured to distribute air from the one or more air transfer devices toward the occupant on the one or more support members along a second area of the one or more support members;
   a control module configured to:
      selectively regulate the first and second thermoelectric devices and the one or more air transfer devices to deliver a volume of air to first and second air distribution devices; and
      maintain a generally consistent overall power consumption rate for the climate controlled seat assembly over a predetermined period of time by turning on or off or modulating electrical energy delivered to the first and second thermoelectric devices and the one or more air transfer devices.

2. The climate controlled seat assembly of claim 1, wherein the control module is configured to have at least one of the first thermoelectric device or the second thermoelectric device activated to deliver conditioned air to at least one of the first air distribution device or the second air distribution device.

3. The climate controlled seat assembly of claim 1, wherein the control module is configured operate the one or more air transfer devices without operating the first and second thermoelectric devices to provide ambient air to the first and second air distribution devices.

4. The climate controlled seat assembly of claim 1, wherein the control module is configured to reduce energy consumption of the climate controlled seat assembly by selectively modulating, over the predetermined period of time, the electrical energy delivered to at least one of the first thermoelectric device, the second thermoelectric device, or the one or more air transfer devices.

5. The climate controlled seat assembly of claim 1, wherein the control module is configured to selectively regulate the first and second thermoelectric devices and the one or more air transfer devices based at least in part on a reading from a sensor.

6. The climate controlled seat assembly of claim 5, wherein the sensor comprises at least one of a temperature sensor, a humidity sensor, or a condensation sensor.

7. The climate controlled seat assembly of claim 6, wherein the temperature sensor is configured to detect temperature of a volume of air downstream of at least one of the first thermoelectric device or the second thermoelectric device for closed loop control.

8. The climate controlled seat assembly of claim 6, wherein the temperature sensor is configured to detect an ambient temperature of air.

9. The climate controlled seat assembly of claim 5, wherein the sensor comprises a pressure sensor, wherein the pressure sensor is configured to indicate when the occupant is positioned on a portion of the climate controlled seat assembly.

10. A climate controlled system configured to maintain a generally consistent overall power consumption rate, the climate controlled system comprising:
  one or more support members configured to contact an occupant;
  a first conditioning zone extending along a first area of the one or more support members;
  a second conditioning zone extending along a second area of the one or more support members;
  a first thermal conditioning device configured to heat or cool the first conditioning zone;
  a second thermal conditioning device configured to heat or cool the second conditioning zone; and
  a control module configured to:
    selectively regulate the first and second thermal conditioning devices to heat or cool the first and second conditioning zones; and
    maintain a generally consistent overall power consumption rate for the climate controlled system over a predetermined period of time by turning on or off or modulating electrical energy delivered to at least one of the first thermal conditioning device or the second thermal conditioning device.

11. The climate controlled system of claim 10, wherein at least one of the first thermal conditioning device or the second thermal conditioning device comprises a thermoelectric device.

12. The climate controlled system of claim 10, further comprising one or more fluid transfer devices configured to deliver fluid to the first and second thermal conditioning devices, wherein the first and second thermal conditioning devices are configured to heat or cool the fluid delivered by the one or more fluid transfer devices, wherein the control module is configured to maintain a generally consistent overall power consumption rate for the climate controlled system over the predetermined period of time by turning on or off or modulating electrical energy delivered to at least one of the first thermal conditioning device, the second thermal conditioning device, or the one or more fluid transfer devices.

13. The climate controlled system of claim 12, wherein the control module is configured to reduce energy consumption of the climate controlled system by selectively modulating, over the predetermined period of time, the electrical energy delivered to at least one of the first thermal conditioning device, the second thermal conditioning device, or the one or more fluid transfer devices.

14. The climate controlled system of claim 12, further comprising:
  a first fluid distribution device downstream of and in fluid communication with the first thermal conditioning device, the first fluid distribution device configured to distribute fluid from the one or more fluid transfer devices toward the occupant along the first area of the first conditioning zone; and
  a second fluid distribution device downstream of and in fluid communication with the second thermal conditioning device, the second fluid distribution device configured to distribute fluid from the one or more fluid transfer devices toward the occupant along the second area of the second conditioning zone.

15. The climate controlled system of claim 10, wherein the control module is configured to selectively regulate the first and second thermoelectric devices based at least in part on a reading from at least one of a temperature sensor, a humidity sensor, or a condensation sensor.

16. A method of maintaining a generally consistent overall power consumption rate for a climate controlled system, the method comprising:
  selectively heating or cooling a first conditioning zone with a first thermal conditioning device;
  selectively heating or cooling a second conditioning zone with a second thermal conditioning device; and
  maintaining a generally consistent overall power consumption rate for the climate controlled system over a predetermined period of time by turning on or off or modulating electrical energy delivered to at least one of the first thermal conditioning device or the second thermal conditioning device.

17. The method of claim 16, further comprising:
  delivering fluid to the first and second thermal conditioning devices with one or more fluid transfer devices;
  selectively heating or cooling the fluid with the first thermal conditioning device;
  selectively heating or cooling the fluid with the second thermal conditioning device; and
  maintaining a generally consistent overall power consumption rate for the climate controlled system over the predetermined period of time by turning on or off or modulating electrical energy delivered to at least one of the first thermal conditioning device, the second thermal conditioning device, or the one or more fluid transfer devices.

18. The method of claim 17, further comprising reducing energy consumption of the climate controlled system by selectively modulating, over the predetermined period of time, the electrical energy delivered to at least one of the first thermal conditioning device, the second thermal conditioning device, or the one or more fluid transfer devices.

19. The method of claim 17, further comprising:
distributing fluid from the one or more fluid transfer devices along a first area of the first conditioning zone; and
distributing fluid from the one or more fluid transfer devices along a second area of the second conditioning zone.

20. The method of claim 16, wherein at least one of the first thermal conditioning device or the second thermal conditioning device comprises a thermoelectric device.

* * * * *